US011940833B2

(12) United States Patent
Battlogg

(10) Patent No.: US 11,940,833 B2
(45) Date of Patent: *Mar. 26, 2024

(54) INPUT APPARATUS AND INPUT SYSTEM, AND METHOD FOR OPERATING AN INPUT APPARATUS

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 68 days.

This patent is subject to a terminal disclaimer.

(21) Appl. No.: 17/631,947

(22) PCT Filed: Aug. 5, 2020

(86) PCT No.: PCT/EP2020/072052
§ 371 (c)(1),
(2) Date: Feb. 1, 2022

(87) PCT Pub. No.: WO2021/023794
PCT Pub. Date: Feb. 11, 2021

(65) Prior Publication Data
US 2022/0283602 A1  Sep. 8, 2022

(30) Foreign Application Priority Data

Aug. 5, 2019 (DE) .................... 10 2019 121 110.7
Feb. 24, 2020 (DE) .................... 10 2020 104 810.6

(51) Int. Cl.
*G05G 5/03* (2008.04)
*G05G 9/047* (2006.01)

(52) U.S. Cl.
CPC ............... *G05G 5/03* (2013.01); *G05G 9/047* (2013.01); *G05G 2009/04766* (2013.01)

(58) Field of Classification Search
None
See application file for complete search history.

(56) References Cited

U.S. PATENT DOCUMENTS 7,650,810 B2   1/2010  Levin et al.
8,607,657 B2 * 12/2013  Haevescher ............ F16H 59/02
                                                    74/473.12

(Continued)

FOREIGN PATENT DOCUMENTS

CN          1646833 A      7/2005
CN        101981353 A      2/2011
(Continued)

*Primary Examiner* — Vicky A Johnson
(74) *Attorney, Agent, or Firm* — Laurence A. Greenberg; Werner H. Stemer; Ralph E. Locher

(57) ABSTRACT

An input apparatus, in particular a joystick, has an operating device, a magnetorheological braking device, and a control device for actuating the braking device. The operating device has a support and an operating lever that is pivotable about at least one pivot axis. A sensor senses a pivot angle of the operating lever. The braking device is coupled to the pivot axis in order to damp, in a controlled manner by way of the control device, a pivot movement of the operating lever. The control device actuates the braking device depending on a control command and converts the control command into a haptic signal, preferably a defined sequence of deceleration torques, which can be perceived on the operating lever. A user, as a result of an input made, can receive haptic feedback (so-called force feedback).

30 Claims, 8 Drawing Sheets

(56) References Cited

U.S. PATENT DOCUMENTS

| | | | |
|---|---|---|---|
| 9,568,939 B2 * | 2/2017 | Guglielmo | G06F 3/016 |
| 10,976,827 B2 * | 4/2021 | Battlogg | A61F 2/60 |
| 2006/0197741 A1 | 9/2006 | Biggadike | |
| 2008/0048515 A1 | 2/2008 | Waggoner et al. | |
| 2011/0056318 A1 | 3/2011 | Rake et al. | |
| 2016/0378131 A1 | 12/2016 | Battlogg | |
| 2019/0111300 A1 | 4/2019 | Battlogg | |
| 2019/0210854 A1 | 7/2019 | Eck et al. | |
| 2019/0286237 A1 | 9/2019 | Eck et al. | |
| 2020/0272193 A1 | 8/2020 | Battlogg | |

FOREIGN PATENT DOCUMENTS

| | | |
|---|---|---|
| CN | 107735748 A | 2/2018 |
| DE | 102004041690 A1 | 3/2005 |
| DE | 602005005897 T2 | 6/2009 |
| DE | 102010055833 A1 | 3/2012 |
| DE | 102012203095 A1 | 9/2013 |
| FR | 3056202 A1 | 3/2018 |
| WO | 2012034697 A1 | 3/2012 |
| WO | 2016156544 A1 | 10/2016 |

* cited by examiner

INPUT APPARATUS AND INPUT SYSTEM, AND METHOD FOR OPERATING AN INPUT APPARATUS

FIELD AND BACKGROUND OF THE INVENTION

The present invention relates to an input apparatus, in particular a joystick, having at least one operator control device and having at least one magnetorheological brake device and having at least one control device for controlling the brake device. The operator control device comprises at least one support device and at least one operator control lever, wherein the operator control lever is held on the support device so as to be pivotable about at least one pivot axle. In particular, at least one sensor means for sensing a pivot angle of the operator control lever is included.

In the prior art, joysticks often have a mechanical slotted guide or mechanical spring or detent systems for the implementation of different functions. In particular, joysticks of utility vehicles or off-highway vehicles, such as construction machines and the like, mostly have mechanical solutions with slotted guides and restoring springs and friction brakes for the corresponding detent positions and for the return into the neutral setting. For the transfer of movement, it is normally the case that a complex transmission and/or a cardan shaft or the like is provided. Potentiometers, Hall effect sensors or encoders are used for the purposes of signal generation and position detection. In the case of desktop applications, tabletop joysticks for indoor applications have become known, for example in laboratories for the control of laboratory apparatuses, medical apparatuses, machines or robots in the industrial sector etc.

Joysticks with force feedback have become known for use in gaming (computer games) and in other usage sectors. By means of such force-feedback joysticks, situations such as rough ground surfaces are captured and fed back to the gamer as mechanical feedback in the form of juddering or light/heavy movement of the joystick. Here, in the prior art, use is normally made of vibration motors that cannot generate any increase in moment or force at the operator control element. Electric motors or hydraulic or pneumatic cylinders, which in the case of professional joysticks/simulators can generate over 100 N (newtons) of actuating force at the operator control surface in order to provide the most realistic feel possible, are expensive, large and complex. In the case of a lever spacing (spacing from the joystick center of rotation to the user's hand) of 10 to 15 cm, this corresponds to a torque of 10 to 15 Nm. In order that such a high torque can be generated with high quality (little hysteresis, low noise, fast response, continuously variable controllability), particularly large and normally very expensive actuators are required, which furthermore take up a large amount of structural space. In many applications, the structural space is very constricted.

SUMMARY OF THE INVENTION

By contrast, the problem addressed by the present invention is that of improving the operator control quality and the functional scope of such an input apparatus (user-oriented configuration of the haptic feedback). The input apparatus should preferably also be usable particularly flexibly for different usage sectors. At the same time, the input apparatus should be of compact construction, or require little structural space, and be uncomplicated and inexpensive to produce.

Said problem is solved by means of an input apparatus having the features as claimed and by means of an input system having the features as claimed and by means of a method having the features of as claimed. Preferred refinements of the invention are the subject of the dependent claims. Further advantages and features of the present invention will emerge from the description of the exemplary embodiments.

The input apparatus according to the invention is configured in particular as a joystick. The input apparatus comprises at least one operator control device and at least one magnetorheological brake device and at least one control device for controlling the brake device. The operator control device comprises at least one support device and at least one operator control lever. The operator control lever is configured in particular as a joystick lever. The operator control lever is held on the support device so as to be pivotable about at least one pivot axle. In particular, at least one sensor means for sensing a pivot angle of the operator control lever is included. The brake device is coupled to the at least one pivot axle in order to dampen at least one pivoting movement of the operator control lever in a manner controlled by the control device. In particular, the control device is suitable and configured to control the brake device at least in a manner dependent on at least one control command. In particular, the control device is suitable and configured to convert the control command into at least one haptic signal which is perceptible at the operator control lever, preferably a defined sequence of retardation moments. In particular, a user can thus be provided with haptic feedback (so-called force feedback) at least as a consequence of an input that has been performed and/or while performing an input.

The input apparatus according to the invention offers numerous advantages. A considerable advantage is offered by the targetedly controlled damping of the operator control lever. Also particularly advantageous is the haptic feedback (so-called force feedback). The operator control quality, and at the same time also the certainty in performing operator control operations, are thereby considerably improved. At the same time, a damping arrangement is made possible which is particularly compact and which saves structural space and which can be implemented in uncomplicated fashion.

In particular, the pivoting movement of the operator control lever is dampened at least in a manner dependent on the pivot angle of the operator control lever sensed by sensor means.

In particular, the pivoting movement of the operator control lever can be dampened by means of the brake device. In particular, the brake device and the control device are operatively connected to one another for this purpose. In particular, the brake device is controllable by the control device. In particular, the pivoting movement of the operator control lever can be dampened in controlled fashion by means of the brake device and by means of the control device. In particular, the brake device is controllable by the control device such that the pivoting movement of the operator control lever is dampened in targeted and preferably (dynamically) adaptable fashion. In particular, the control device determines a setpoint retardation moment in a manner dependent on at least one of the parameters described below, and then controls the brake device such that the brake device imparts a setpoint retardation moment for the purposes of damping the pivoting movement of the operator control lever. Preferably, the operator control lever can, after an actuation has been performed, be automatically pivoted back into an intended neutral setting by means of at least one restoring unit. Here, the control device is preferably suitable and configured to targetedly dampen, by means of the brake device, a restoring movement performed by the restoring unit. Preferably, the damping of the restoring movement may be performed separately for all pivot axles provided. In particular, the damping of the restoring movement is performed by adaptation of a retardation moment of the brake device.

By means of the damping of the restoring movement, an undesired overshoot of the operator control lever about the neutral setting is prevented in an effective manner. It is thus ensured that, owing to the spring restoring force, the operator control lever is, after being released, braked and pulled back precisely toward the neutral position. In the case of conventional joysticks, the lever, after being released from a spring-preloaded position (for example end setting), normally oscillates beyond the neutral setting and back from there, such that the lever settles only over a period of time. This is highly problematic for the operator control of vehicles and machines and is highly undesirable in gaming, because this oscillation decay movement also gives rise to inputs or control commands originating from the input apparatus, that is to say the tool operated using the joystick performs the same oscillation decay movement. With the invention or one of its refinements, this problem is solved, and at the same time the operator control convenience and the operator control certainty are considerably improved.

The input apparatus may particularly advantageously be used for example for control in vehicles and/or aircraft and in particular for control in utility vehicles and preferably in the control of off-highway vehicles (such machines may also be referred to as self-propelled work machines) such as piste crawlers, tractors, excavators, cranes etc. Here, the input apparatus may be usable for controlling driving operation and/or other functions and for example work functions.

The input apparatus may particularly advantageously also be used for computer games or gaming. These, or a situation simulated in the case of these by means of an item of software, are possible examples:

A staircase in a game via which the virtual gamer must walk can be replicated at the joystick as ripple-like feedback. If the virtual gamer, moved by the joystick, is standing in front of a door or wall, then the actuation force increases as far as the end stop (high actuation force or high pivoting moment at the actuation lever). If the gamer in a football game (for example FIFA) is in possession of the ball, the joystick becomes heavier to actuate.

In target and shooting games: different feedback selected depending on the weight or firepower of the weapon. The moment profile of the trigger on the game controller (joystick in the Y direction) for the actuation of firearms in the game changes in accordance with the selected weapon. Weapon jamming: blocked. Munition runs out: becomes heavier or ripples.

Simulation games (car racing games . . . ): In a car racing game or farm simulator: control of the actuation force (for example the driving of the vehicle) dependent on the underlying surface such as asphalt, sand, earth etc. Peak valley— in settings, or during acceleration, that is to say resistance. Full stop—in the event of a collision in a racing game, such that the collision is felt. Fine ripple—when scrolling, or on asphalt. Medium ripple—when driving on relatively soft underlying surface. Hard ripple—driving on fields, hills etc.

Assistance (learning mode): preferred joystick movements (for example the gamer should move only in the Y direction) are lighter than joystick movements/commands that are disadvantageous for the positive course of the game.

Networked play: the haptics (force feedback) changes in a manner dependent on the other gamers or their input/cooperation. Faster and more precise control is thus possible.

The input apparatus may also be used for other applications. For example, the input apparatus may be used for the operator control of aircraft (for example drones), electronic apparatuses/smart devices, televisions (for example as a joystick on the remote control, for navigation through apps or channels and selection thereof), machines, in particular machine tools and manufacturing machines, and apparatuses and preferably medical technology apparatuses or industrial robots.

The navigation of a cursor in a display/display apparatus is thus also advantageously possible. If, for example, an important location or an important input destination, for example in a navigation application, is virtually passed over by the cursor that is moved by the joystick, then the joystick may briefly output a higher torque or a higher operator control force (force feedback), whereby the user recognizes this more quickly and can select it more easily. Selection=confirmation by pressing a button on the joystick or movement of the joystick in the Z direction (push). The haptic feedback (force feedback) may be adapted depending on importance and also in a manner dependent on the situation. If the vehicle requires electrical energy or fuel, and for example the vehicle user, with the cursor, virtually passes over a refueling station in the navigation app that will be closed at the calculated arrival time, this information is haptically transmitted to the hand of the user by an absence of feedback or only light feedback (no or only a light ripple). Preferred refueling stations are haptically depicted with greater intensity. Here, in the case of electric vehicles, the possible range is incorporated into the calculation in real time and weighting is performed in accordance with the range (destinations that can reliably be reached: hold/stop (high torque at the joystick), destinations that are critical owing to the battery range: no feedback whatsoever or (followed) by intense vibration as a warning . . . ). This also applies if, on a machine tool, tools are selected, in the case of a CAD system, an important drawing line or a dimensioning start point must be "captured", or in the case of a camera, the focus point must be "captured", or destinations are flown to in the case of a drone or in a game (gaming).

For the targeted damping of the restoring movement, it is provided in particular that a retardation moment is adapted to a profile of a characteristic curve of the restoring unit. In particular, the characteristic curve describes a restoring moment as a function of the pivot angle of the operator control lever. In particular, the retardation moment is set in a manner dependent on the pivot angle of the operator control lever, such that the retardation moment at the respective pivot angle is equal to or greater than the restoring moment at the same pivot angle. In particular, the retardation moment is adapted to a spring characteristic curve of a restoring spring. In particular, for this purpose, the pivot angle of the operator control lever is sensed by the sensor means.

The sensor means comprises in particular at least one sensor (for example encoder, rotary encoder, Hall sensor . . . ). The sensor is for example an angle sensor and in particular a rotational angle sensor. It may be possible for an absolute setting (for example absolute value encoder) or a relative setting to be sensed. The sensor means may sense the pivot angle of the operator control lever directly or else indirectly by way of a setting of another component and in particular of the brake device. For example, for this purpose, an angular setting and/or an angle of rotation of the brake device is sensed. The sensed pivot angle is preferably provided to the control device for the control of the brake device.

Preferably, the control device is suitable and configured to automatically fix the operator control lever in the present actuation setting after an actuation has been performed. For this purpose, the control device is preferably suitable and configured to targetedly set at least one retardation moment by means of the brake device. The set retardation moment corresponds in particular to a restoring moment of the preferably provided restoring unit at/in the present actuation setting, or is greater than such a restoring moment. This has the advantage that, after being released at any setting, the operator control lever remains in the respective setting and does not return into the neutral setting. Such a function, also referred to as "smart stop", is highly advantageous for numerous operator control scenarios.

Here, the holding/retardation moment may be set to be so high that, with an elevated expenditure of force, an onward movement of the operator control lever is possible (overriding). The retardation moment may however also be set to be so high that the operator control lever is blocked in the presence of the operational manual forces. The onward movement of the operator control lever with elevated expenditure of force and/or the blocking of the operator control lever may be implemented here in at least one or else in multiple pivoting directions.

In all refinements, it is particularly preferable that the operator control lever is held on the support device so as to be pivotable about at least two pivot axles. The operator control lever may also be held on the support device so as to be pivotable about at least three or four or more pivot axles. In particular, the operator control device comprises at least two or three or more pivot axles. In particular, the operator control lever is held on the support device so as to be pivotable about at least two axles and preferably more axles.

It is preferable if in each case at least one brake device is coupled to in each case at least one pivot axle. Preferably, the control device is suitable and configured to in each case separately, and in particular also mutually independently, dampen at least a portion of the provided pivot axles, and preferably all of the provided pivot axles, during a pivoting movement of the operator control lever. In particular, all pivoting movements of the operator control lever can be dampened separately and preferably also independently of one another. It is also possible for two or more pivot axles to be equipped with a common brake device. Then, in particular, a transmission device is provided for coupling the pivot axles to the common brake device.

It is advantageous and preferable if the control device is suitable and configured to control and preferably adapt, and in particular vary and/or targetedly maintain, the brake device in a manner dependent on a pivot angle of the operator control lever sensed by sensor means. The control device is preferably suitable and configured to adapt the damping of the pivoting movement of the operator control lever at least in a manner dependent on a pivot angle of the operator control lever sensed by the sensor means. The input apparatus comprises, in particular, at least one sensor means for sensing the pivot angle of the operator control lever (in particular the sensor means described above). In particular, the pivot angle of the operator control lever can be sensed separately for each pivot axle that is provided. For example, at least one angle sensor or the like is provided for each pivot axle. In particular, the control device is suitable and configured to set a retardation moment for the operator control lever by means of the brake device in a manner dependent on the pivot angle and/or the time. In particular, the control device adapts the retardation moment taking into consideration the pivot angle and/or the time, and preferably dynamically. In particular, it is possible for damping curves, which describe the retardation moment as a function of the pivot angle and/or the time, to be set and dynamically varied.

It is likewise advantageous and preferable if the control device is suitable and configured to control the brake device in a manner dependent on at least one control command from an input receiving apparatus. In particular, the input receiving apparatus is couplable or coupled to the input apparatus such that an operative connection exists. The input apparatus according to the invention may comprise at least one input receiving apparatus. It is also possible for the input receiving apparatus and the input apparatus to be provided by one input system. Such a control command may be issued independently of an input and/or as feedback in relation to an input performed into the input receiving apparatus using the input apparatus. In particular, the retardation moment is adapted in a manner dependent on the control command. The control command may relate to at least one real operating situation (in particular an operating situation of the input receiving apparatus and/or of the input apparatus) and/or at least one situation simulated by means of an item of software.

In particular, the control device is suitable and configured to receive the control command and then adapt the retardation moment at least taking into consideration the control command. In particular, the control device is suitable and configured to perform the control of the brake device as described above and/or below also at least partially in a manner dependent on the control command. In this way, the damping of the operator control lever can be adapted to the respective requirements of an input receiving apparatus, such that optimum and particularly reliable operator control is possible at all times.

It is also preferable and advantageous if the at least one control command is provided by the input apparatus itself. A control command provided by the input apparatus itself is for example the pivot angle sensed by sensor means and/or the movement speed of the operator control lever and/or a time and/or an operating mode of the input apparatus and/or a user input stored in the input apparatus (for example selected user profile, button actuation etc.) and/or at least one (other) parameter sensed by sensor means (for example acceleration or situation of the input apparatus). The control command may be stored in the control device and/or generated by said control device using stored algorithms. The control command may be generated and/or adapted by at least one user input. It is also possible for at least one control command to be provided from another source. In particular, the control device may receive and process multiple different control commands.

Preferably, the control device is suitable and configured to convert the control command into at least one haptic signal (change in force/moment) that is perceptible at the operator control lever, in particular such that the user can be provided with haptic feedback (for example an elevated force at the human-machine interface) as a consequence of an input that has been performed. In particular, the input receiving apparatus may targetedly influence the mobility or damping of the operator control lever. In this way, haptic feedback (such as force feedback) can be implemented in a particularly advantageous manner. The haptic signal preferably comprises at least the defined sequence of retardation moments described in the context of the present invention. The haptic signal particularly preferably comprises at least the defined sequence, described in the context of the present invention, of (rapidly) changing retardation moments or forces at the human-machine interface (also referred to as ripples/ticks/raster). For example, a state of the vehicle or of the machine can be communicated in this way.

The control device is in particular suitable and configured to block at least one pivoting movement of the operator control lever in at least one pivoting direction and to enable at least one pivoting movement in at least one opposite pivoting direction. In this way, the operator control lever can, if required, be moved in only one direction along the pivot axle. Such unidirectional mobility of the operator control lever is advantageous for many situations and can be activated and deactivated as desired by way of the invention. In particular, the control device is suitable and configured to unidirectionally and/or bidirectionally and/or multidirectionally block the pivoting movement out of the neutral setting and/or out of a present actuation setting. Direction-dependent damping of the pivoting movement of the operator control lever may also be possible.

In particular, the control device is suitable and configured to vary the direction in which the operator control lever is blocked and the direction in which the operator control lever is released. In particular, the direction is varied at least in a manner dependent on a situation and/or the pivot angle and/or the time and/or the control command. The control device may preferably also block both directions and/or enable both directions and/or apply a constant and/or variable retardation moment in both directions.

The control device is preferably suitable and configured to, when at least one defined pivot angle is reached, increase the retardation moment by means of the brake device over at least one particular pivot angle range, and in particular, after the pivot angle range has been passed through, to fix the operator control lever in at least one target setting outside the neutral setting. For this purpose, the control device may targetedly set at least one retardation moment which corresponds to or is higher than a restoring moment of the restoring unit at the target setting.

Thus, after the torque peak has been passed through, the operator control lever automatically remains in its setting if it is released (kick and hold). The target setting is defined in particular by a pivot angle of the operator control lever along at least one pivot axle. Preferably, the control device is suitable and configured such that, below the defined pivot angle, said control device moves the operator control lever back into the neutral setting.

Here, the control device is preferably suitable and configured to dynamically stipulate the defined pivot angle and/or the retardation moment and/or the pivot angle range and/or the target setting. The stipulation may be performed in a manner dependent on the pivot angle of the operator control lever and/or the time and/or the control command. In particular, the control device is suitable and configured to set and/or cancel and in particular dynamically stipulate the pivot angle range and/or the target setting at any desired position in the operational pivoting range of the operator control lever.

Preferably, the control device is suitable and configured to provide the elevated retardation moment for passing through the pivot angle range in only one pivoting direction, such that, after having passed through the pivot angle range, the operator control lever can be pivoted back again without such an elevated retardation moment. For example, a brief resistance is generated in one direction, whereas the return movement to the neutral setting takes place without additional resistance (kick down). In particular, the control device adapts the elevated retardation moment and/or the direction for the elevated retardation moment in a manner dependent on the pivot angle and/or the time and/or the control command, and in particular dynamically.

In one preferred and advantageous refinement, the control device is suitable and configured to fix the operator control lever at at least one settable detent position and preferably at a multiplicity of dynamically determinable detent positions. Here, the control device is preferably suitable and configured to use the brake device to targetedly increase (raise by a defined factor) a present retardation moment, such that neither an onward movement nor a restoring movement can take place (by hand and/or by means of the restoring unit) without additional expenditure of force and/or without additional action by the user. In particular, the control device is suitable and configured to dynamically stipulate the detent position, and preferably determine said detent position in a manner dependent on the pivot angle and/or the time and/or the control command.

Such a refinement offers numerous advantages and, for example, allows the simulation of a selector lever of an automatic gearshift for motor vehicles (P R N D). Furthermore, the input apparatus may be used for a very large number of different apparatuses and machines or vehicles without the need for structural modifications. The user is provided with individual and adapted feedback in accordance with the intended use. This increases the operator control convenience and reduces incorrect operator control actions. By means of the detent positions, the inputs can be performed particularly intuitively and precisely.

In particular, any desired number of detent positions that can be implemented by means of the brake device can be set at any desired positions in the operational pivoting range of the pivot lever. In particular, the detent positions may be set in a manner dependent on the pivot angle and/or the time and/or the control command. In particular, the detent positions are defined at least by a pivot angle and a retardation moment. The action by the user comprises in particular at least one actuation of at least one switch element. For example, the pushing of a button on the operator control lever is provided.

The control device is in particular suitable and configured to increase the retardation moment proceeding already from a defined pivot angle before a detent position is reached, and/or to reduce the retardation moment proceeding from a defined pivot angle after the detent position has been departed from. The increase and/or reduction may be implemented in continuous or variable fashion.

In one particularly advantageous refinement, the control device is suitable and configured to block the operator control lever when at least one particular pivot angle is reached and/or in the neutral setting and/or in a present setting such that no onward movement in at least one pivoting direction, and/or in all operational pivoting directions, is possible with a manual force that is to be imparted during operation. For such blocking, the control device in particular increases a present retardation moment by a defined factor. A mechanical stop can thus be simulated particularly effectively. An advantage in relation to conventional mechanical damping means is that no stick-slip effect arises here, and no static friction has to be initially overcome. Such blocking may also be provided in at least one of the detent positions described above.

It is possible that, before the defined pivot angle is reached, a free and/or lightly damped movement of the operator control lever is provided in order to allow an automatic return from there into the zero setting.

It is possible that the control device blocks the pivoting movement of the operator control lever for all pivot axles and for all pivoting directions such that no onward movement is possible with the manual force that is to be imparted during operation. Such an operating mode (axis locked) allows reliable and secure blocking of the input apparatus as required or in a manner dependent on the situation (situation-dependent feedback). Blocking in only one pivoting direction and/or only for targeted pivot axles is also possible. The selection of the pivoting direction and/or of the pivot axle is performed for example on the basis of a control command or an action by the user or near-field detection. If, for example, a container in a container lane of a container port (where further containers stand to the left and to the right of the container lane) is moved forward or back (X axis) by means of the joystick, the lateral movement axis (Y) can be blocked or implemented with heavy movement, which prevents a collision or makes such a collision impossible. Near-field detection systems (movement sensors, camera sensors, GPS, radar systems . . . ) detect the situation, a processing unit analyzes the data, and incorporates these data in real time into possible or expedient movement patterns of the joystick.

Preferably, the control device can adapt the retardation moment taking into consideration a movement speed of the operator control lever, in particular an angular speed of a transmission stage and/or of the brake device. In particular, the control device is suitable and configured to at least approximately compensate for a structurally induced speed-dependent retardation moment of the brake device in order to make a uniform retardation moment possible over different speeds.

It is preferable that the control device is suitable and configured to simulate at least one slotted guide mechanism by means of a combination of a multiplicity of detent settings and at least one zero setting and/or at least one target setting and/or a multiplicity of pivot-angle-dependent blockages of the operator control lever. For example, it is possible for a slotted guide mechanism of a mechanical manual gearbox of a motor vehicle, and for example an H-shaped gearshift gate, to be simulated. In particular, the input apparatus comprises at least two pivot axles for this purpose (X and Y axes). In particular, multiple brake devices are coupled to a respective pivot axle in order to generate a slotted-guide-like movement of the operator control lever in a manner controlled by the control device. In particular, the operator control lever is fixed in a shift setting or position and can advantageously also be held there for a relatively long period of time, as in an H-shape gearshift gate, for example. Permanent magnets may advantageously be used for the purposes of fixing in order that the magnetorheological brake device does not have to be permanently electrically energized, that is to say build up a retardation moment, in the gearshift setting.

In particular, at least one control algorithm for simulating at least one slotted guide mechanism is stored in the control device. In particular, the control device selects and simulates a particular slotted guide mechanism in a manner dependent on a user input and/or the control command of the input receiving apparatus. If the input apparatus is installed in a utility vehicle, it is for example possible for a different slotted guide mechanism to be simulated for a manual gearbox than for the operation of a working function. It is thus possible for one joystick to perform multiple functions.

In one particularly advantageous refinement, the control device is suitable and configured to retard and enable the pivoting movement of the operator control lever by means of the brake device in a targeted sequence. In order to implement such a sequence, the control device is in particular suitable and configured to set retardation moments of different magnitude for the retardation and the enablement. Such a sequence offers reliably perceptible haptic feedback even under adverse operating conditions, and can be implemented particularly effectively by way of the invention.

The sequence is in particular made up of a sequence of relative maxima, with relatively high retardation moment, and relative minima, with relatively low retardation moment. In particular, an angular interval of a period of adjacent relative maxima is settable and is set. In particular, the profile of the retardation moment over one period is set in a manner dependent on a set operating mode. Such a sequence with particularly short intervals may also be referred to as ripples/ticks. In particular, such a sequence is formed from a defined combination of retardation moments as a function of the time and/or of the angle. Preferably, the retardation moments for the retardation and/or the enablement are set as a function of the time and/or as a function of the pivot angle and/or in a manner dependent on a control command. In particular, such a sequence may be set in a manner dependent on the pivoting direction, and may for example be implemented only in one pivoting direction or else in both pivoting directions.

Such a sequence may also be provided for the damping of the restoring movement. Then, after the actuating lever has been released, the restoring movement is for example dampened such that the operator control lever is returned into the neutral setting with a ripple.

The retardation moments of the sequence are in particular started and/or held and/or ended on an angle-dependent and/or time-dependent basis. An alternation of such dependencies within one sequence may preferably also be provided. For example, the start of the sequence is implemented on an angle-dependent or time-dependent basis, and the length of the sequence is then set on a time-dependent or angle-dependent basis.

Preferably, the control device is suitable and configured to start the retardation moments of the sequence on an angle-dependent basis and maintain them on a time-dependent basis. In particular, the control device is suitable and configured to omit the setting of a retardation moment provided in the sequence if an angular position intended for the start (particular pivot angle of the operator control lever) is passed through while a retardation moment is being maintained.

The control device is particularly preferably suitable and configured to set the different retardation moments of the sequence with a targeted frequency and preferably with a frequency which is such that the pivoting movement of the operator control lever is dampened with a targeted vibration. In particular, the frequency is at least 20 Hz and preferably at least 50 Hz.

The control device is in particular suitable and configured to dynamically adapt the different retardation moments of the sequence versus the time and/or the pivot angle and/or the movement speed (angular speed) of the operator control lever and/or the number of settings of retardation moments that have already taken place. Such parameters may also be provided by the control command. For example, in this way, the approaching of an end setting or detent position can be haptically signaled. In this way, it is for example possible for the user to be warned if they pivot the operator control lever such that the vehicle moves into an operating state which requires particular attentiveness (movement of the tool or of the payload into spatially restricted regions; risk of collision . . . ).

The control device may dynamically adapt the different retardation moments of the sequence also in a manner dependent on the control command of the input receiving apparatus and/or of the input apparatus. For example, the attainment of a maximum speed or of an overload of a crane boom may be transmitted to the input apparatus by means of the control command, such that the user thereupon senses a vibration of the operator control lever.

For example, the maximum payload of a crane boom is dependent on the movement position. The loads that can be moved further outward on the boom are lower than those that can be moved in the vicinity of the center of the crane. Measurement and near-field detection systems can detect and analyze the situations and communicate to the operator haptically, by way of changes in force in the operator control element, when they are moving in the "green" region (admissible, non-critical), "orange" region (could be critical) or red region (overload—the load is too far to the outside on the boom). The operator can then decide, on the basis of the haptic feedback in the operator control element, how to proceed further. This important feedback is received without the need for the operator to avert their eyes from the operation, that is to say the operator does not need to look at a display in the operator's cabin for this purpose, which is a major advantage.

The control device is in particular suitable and configured to set a sequence with targetedly varying retardation moments. In particular, a sinusoidal or cosinusoidal profile is provided for this purpose. In particular, the profile has, for this purpose, a (slight) negative offset. The offset is in particular less than 30% and in particular less than 20% and preferably less than 10%. In particular, at least two zero crossings are provided in each period of the profile.

In particular, the brake device is controlled with a sinusoidal or cosinusoidal signal, in particular with a predetermined and in particular settable (slight) offset from the zero point. Such a sequence particularly preferably has a profile which corresponds to a spring characteristic curve of a mechanical spring. This allows particularly realistic simulation of a mechanical joystick.

It is possible and preferred that the control device is suitable and configured to output at least one haptic warning signal, and for this purpose to preferably set a defined sequence of retardation moments, in the event of an actuation of the operator control lever after a defined time without an actuation of the operator control lever. The sequence is in particular configured as described above. It is also possible and preferable that, after a defined time without an actuation of the operator control lever, the operator control lever is dampened and/or blocked with increased intensity in at least one pivoting direction, and/or in relation to at least one pivot axle, in the manner described above. An inadvertent actuation can thus be effectively counteracted.

It is preferable that the control device is suitable and configured to control the brake device with a control frequency of at least 5 kHz and preferably at least 10 kHz and particularly preferably at least 50 kHz. In particular, the brake device is suitable and configured to implement such a control frequency.

In particular, the control device is suitable and configured to dampen the brake device in real time. In particular, the brake device is suitable and configured to implement the retardation moment in real time. In particular, the damping is adaptable by means of the control device of the brake device in real time in a manner dependent on the pivot angle and/or the time and/or a control command and/or a movement speed or angular speed of the operator control lever. In particular, the brake device is suitable and configured to vary the retardation moment by at least 30% within less than 100 milliseconds. In particular, the retardation moment is variable by at least 10%, preferably by at least 30% and particularly preferably by at least 50%, within less than 10 milliseconds. The retardation moment may also be variable by at least 100% or 500% or by 10 times or by 1000 times within less than 100 milliseconds.

The magnetorheological brake device is preferably suitable and configured, in particular by means of a sensor, rotary encoder or incremental encoder, to provide at least 30 000 increments, in particular 30 000 increments/rotation, for a pivot axle of the operator control lever. Incremental encoders provide, for example, a particular number of pulses per rotation, or also one so-called zero pulse per rotation. These may be incremental encoders with UVW signals or absolute encoders. Haptic signals can thus be implemented in a particularly effective manner. In particular, the increments can be used to provide the above-described detent positions and/or the sequences. In particular, at least 30 000 increments can be provided per rotation of the brake device and/or of the transmission stage. In particular, the sensor means may comprise at least 30 000 increments per rotation of the brake device.

The brake device is preferably coupled to the at least one pivot axle via at least one transmission stage. The transmission stage preferably has at least a speed ratio between 2:1 and 5:1. Other speed ratios are also possible.

In particular, the transmission stage comprises at least one belt drive. In particular, the belt drive couples the pivot axle to a rotary axle of the brake device. In particular, the belt drive comprises at least two belt pulleys and at least one belt. Other types of transmission stages are also possible. For example, the transmission stage may have a toothed-gear transmission and/or lever transmission or the like. In particular, the pivot axles are coupled to in each case one rotary axle of the brake device.

It is preferable and advantageous that the brake device is configured as, or comprises at least one, rotary damper. Here, it is preferably provided that the rotary damper comprises two components, wherein one component comprises an inner component and the other component comprises an outer component, and wherein the outer component radially surrounds the inner component at least in certain sections, wherein, between the components, there is arranged a ring-shaped and encircling damping gap which is delimited radially at the inside by the inner component and radially at the outside by the outer component and which is at least partially filled with a magnetorheological medium, wherein the damping gap can be exposed to a magnetic field in order to dampen a pivoting movement between the two mutually pivotable components about an axle, and wherein a multiplicity of at least partially radially running arms is provided on at least one of the components, and wherein at least a part of the arms is equipped with an electrical coil with at least one winding, wherein the winding extends in each case adjacent to the axle and so as to be spaced apart from the axle. In particular, the electrical coil of the rotary damper is provided for generating the magnetic field and is controllable by the control device in order to targetedly set and adapt the retardation moment.

A rotary damper that is particularly advantageously suitable for use in the case of the brake device according to the invention is described for example in the patent application WO 2016/156544. The entire disclosure of WO 2016/156544 is hereby preferably part of the content of disclosure of the present application.

It is also preferable and advantageous that the brake device is configured as, or comprises at least one, magnetorheological transfer device. Here, it is preferably provided that the magnetorheological transfer device is equipped with at least two couplable components, the coupling intensity of which can be influenced, wherein at least one channel is provided for the purposes of influencing the coupling intensity, wherein the channel contains a magnetorheological medium which can be influenced by a magnetic field and which has magnetically polarizable particles, and wherein at least one magnetic-field-generating device for generating at least one magnetic field in the channel is provided in order to influence the magnetorheological medium in the channel by means of the magnetic field, wherein one component, as an outer component, surrounds the other component, as an inner component, and wherein at least one of the two components is mounted by means of at least one separate bearing, and wherein a spacing between the outer component and the inner component is at least ten times a typical mean diameter of the magnetically polarizable particles in the magnetorheological medium, and the channel can be at least partially subjected to the magnetic field of the magnetic-field-generating device in order to selectively interlink or release the particles. In particular, the magnetic-field-generating device of the transmission device is controllable by the control device in order to targetedly set and adapt the retardation moment.

A magnetorheological transfer device that is particularly advantageously suitable for use in the case of the brake device according to the invention is described for example in the patent application DE 10 2010 055 833 A1 and in the patent application WO 2012/034697 A1. The entire disclosure of DE 10 2010 055 833 A1 and/or of WO 2012/034697 A1 is hereby preferably part of the content of disclosure of the present application.

The above-described brake devices can be particularly advantageously used in the case of the input apparatus according to the invention. They can impart the required retardation moments and also set said retardation moments quickly and if necessary in real time, and are at the same time particularly compact and furthermore highly robust.

A magnetorheological medium preferably comprises at least one carrier medium into which at least magnetically conductive particles (for example carbonyl iron particles) are mixed. The carrier medium may for example comprise an oil, alcohol or else water or some other liquid. It is also possible for a separate carrier medium to be omitted, or the carrier medium is formed (at least substantially or entirely) by the magnetically conductive particles, which may optionally be coated.

It is also possible in particular for a preferably liquid carrier medium to be substantially or entirely omitted (vacuum between the particles). It is thus possible for the channel to be filled only by particles that can be influenced by the magnetic field. A gas is preferably added, or the gas is already present. This may for example be air or an inert gas. If, for example, only air or some other gas is used, it is possible for different solids to be mixed therewith in order to improve certain properties. For example, graphite powder may be admixed in order to reduce the friction between the particles (for example carbonyl iron particles), because graphite exhibits a lubricating action. The particles may in particular be coated. PTFE is preferably used. A coating with PTFE or a similar coating preferably prevents the particles from adhering too strongly to one another and thereby forming lumps and/or agglomerating to form larger accumulations/lumps. Above a certain size, these accumulations may become difficult to break up again. Larger accumulations do not disintegrate easily, or under certain circumstances can no longer be disintegrated at all.

It is advantageous that the particles occupy a significant fraction of the available volume. In the case of a substantially uniform or homogeneous particle size of all particles, a particle fraction is preferred which is in particular at least greater than 33% or 50% or 66% and preferably greater than 74%. A greater fraction of the available volume is also possible. Here, it is preferably possible to achieve a greater density of particles. The particles have in particular an inhomogeneous size distribution. Here, the smaller particles can arrange themselves preferably in the intermediate spaces between the larger particles.

The input system according to the invention comprises at least one input apparatus according to the invention and at least one input receiving apparatus that is operatively connected to the input apparatus. The input receiving apparatus is preferably configured as a utility vehicle, such that the functions of the utility vehicle can be at least partially operated using the input apparatus. It is also preferable that the input receiving apparatus is configured as a computer, and that the computer is in particular equipped with a simulation program and/or a game program. A computer is to be understood for example to mean the following: processing unit, control unit, computing unit, which processes data using programmable processing rules, etc. In particular, the functions of the simulation program and/or of the game program can be at least partially operated using the input apparatus.

The utility vehicle is preferably configured as an off-highway vehicle. Such a utility vehicle can also be referred to as a self-propelled work machine. In particular, the utility vehicle is an agricultural or silvicultural utility vehicle. Other types of utility vehicles are also possible. For example, the utility vehicle is configured as a tractor, harvester, excavator, crane or the like. The utility vehicle may also be configured as a drone or some other aircraft.

The operator control lever may advantageously be permanently acted on with a low retardation moment by the control device and the magnetorheological brake device. It is thus possible in particular to prevent the input apparatus from being inadvertently moved in the event of vibrations during travel or else while the input apparatus is not being used. Small vibrations can be advantageously eliminated by damping. The damping or the retardation moment is in this case preferably configured to be so low that the input apparatus and in particular the joystick can nevertheless be easily moved by a user. This can be advantageous in particular in the case of an off-highway vehicle.

The input system according to the invention also offers a particularly advantageous solution to the above-stated problem. Here, the input apparatus and the input receiving apparatus are preferably configured as described above for the input system according to the invention.

The method according to the invention serves for the operation of an input apparatus and in particular of a joystick. At least one operator control lever of the input apparatus is at least partially pivoted manually about at least one pivot axle in order to perform an input into an input receiving apparatus that is operatively connected to the input apparatus. At least one pivoting movement of the operator control lever can be targetedly dampened (and enabled) by means of a magnetorheological brake device that is coupled to the pivot axle. The brake device is controlled by means of at least one control device at least in a manner dependent on a pivot angle (which is in particular sensed by at least one sensor means) and/or in a manner dependent on a movement speed of the operator control lever and/or in a manner dependent on the time and/or in a manner dependent on at least one operating state of the input receiving apparatus, in order to targetedly adapt the damping.

The method according to the invention likewise offers numerous advantages. Preferably, the method is configured such that the above-described input apparatus and/or the input system can be operated in accordance with said method.

In particular, the input apparatus according to the invention and/or the input system are suitable and configured to be operated in accordance with the method according to the invention.

The operating state of the input receiving apparatus preferably relates to at least one of the following parameters: power state, speed, acceleration, situation in space, surroundings, underlying surface being driven on, work performed, selected user profile, selected operating mode, activity of an assistance system and in particular driving assistance system, situation simulated by means of an item of software, input condition in the operator control of a program (menu points, selection possibilities, fields etc.).

The pivotability of the operator control lever is preferably dampened or blocked with targetedly intensified action if an operating state with a disturbance (for example owing to a rough underlying surface or work-induced vibrations) and/or hazard (for example high speed) that exceeds a threshold value is present and/or if an assistance system actively intervenes in the use of the input receiving apparatus. To detect such operating states, the input receiving apparatus preferably has at least one suitable sensor means and for example an acceleration sensor or the like.

In particular, at least one actuating element is formed on the operator control lever. In particular, the actuating element is configured as an automatically restoring operator control button or operator control key. In addition or alternatively, at least one operator control switch may be provided. A user input can be performed by means of this, which user input has an effect on the damping of the pivoting movement of the operator control lever. For example, targeted blocking of the pivoting movement can be eliminated by means thereof.

An operating state with a parameter that exceeds a threshold value and/or with a hazard that exceeds a threshold value and/or with an intervention of an assistance system is preferably haptically signaled by means of a targeted sequence of different retardation moments during a pivoting movement of the operator control lever. Such a sequence is preferably configured as described above for the input apparatus according to the invention. In this way, incorrect operator control of the input receiving apparatus can be effectively and reliably counteracted. It is also possible for the pivoting movement of the operator control lever to be more lightly damped, or enabled, if the parameter and/or the hazard fall below the threshold value.

It is advantageous and particularly preferable that the pivotability (pivoting movement) of the operator control lever is dampened with variably but targetedly intensified action, and/or is blocked, in a manner dependent on at least one situation. It is preferably provided that the pivoting movement of the operator control lever is variably adapted in a manner dependent on at least one real operating situation (in particular an operating situation of the input receiving apparatus and/or of the input apparatus), and/or at least one situation simulated by means of an item of software, such that targetedly intensified or reduced damping, or even a blocking action, is implemented.

For embodiments with damping in a manner dependent on the pivot angle and/or the movement speed of the operator control lever, it is the case in particular that the pivot angle and/or the movement speed of the operator control lever are/is sensed by at least one sensor means.

In the context of the present invention, the described embodiments for the targeted damping of the pivoting movement may preferably be implemented separately for all or at least a proportion of the provided pivot axles and/or pivoting directions. In particular, a pivoting movement of the operator control lever about one pivot axle can be damped independently of a pivoting movement of the operator control lever about at least one other pivot axle. In particular, the directions of the pivoting movements of the operator control lever can be damped separately and preferably also independently of one another. In particular, a forward movement can be damped separately from, and preferably independently of, a backward movement.

In the context of the present invention, the expressions "damping" and "retarding" can preferably be used synonymously. Here, the control device is in particular suitable and configured to targetedly retard and enable the at least one pivoting movement and the restoring movement, and to block these in the presence of the manual forces at the operator control lever that are to be expected during operation. The pivoting movement may also comprise, or take the form of, a rotational movement. In particular, manual forces of at least 100 N can be generated at the operator control lever. In the context of the present invention, all suitable retardation moments may preferably also be used, and adapted according to the invention, as holding moments for holding the operator control lever.

In particular, the damping of the pivoting movement is performed through adaptation of a retardation moment of the brake device. In particular, the control device is suitable and configured to adapt a retardation moment of the brake device in order to targetedly dampen the pivoting movement. In particular, the control device is suitable and configured to dynamically set the retardation moment.

The control device can preferably, for any desired pivot angle that can be reached by the operator control lever and/or for a settable duration, set any desired retardation moment that can be generated by means of the brake device. In particular, the control device comprises a multiplicity of settable operating modes and is preferably suitable and configured to perform an assignment of retardation moment and pivot angle and/or duration in a manner dependent on the operating mode.

The control device is in particular an electronic control device. The control device comprises in particular at least one control algorithm. In particular, a retardation moment is set through control of an electrical coil device of the brake device with a particular electrical current and/or a particular voltage or a suitable signal.

In particular, the retardation moment is adapted as a function of the pivot angle and/or the time and/or the movement speed (in particular angular speed) of the operator control lever and/or of the control command of the input receiving apparatus. In particular, the pivoting movement is dampened in dependence on the angle and/or in dependence on time and/or dynamically. In particular, the control device is suitable and configured to dampen the pivoting movement with a retardation moment that is constant or variable, and in particular dynamically adapted, versus the time and/or the pivot angle.

In the context of the present invention, an enablement of the pivoting movement is to be understood in particular to mean that only an operational base moment of the brake device is present without additionally superposed magnetorheological retardation, for example by electrical energization of a coil device of the brake device. If the pivoting movement is enabled, the magnetorheological brake device is in particular inactive, such that no field is generated for actively influencing a magnetorheological medium of the brake device.

In particular, the embodiments described in the context of the present invention with regard to the damping of the pivoting movement can also be used analogously for the damping of the restoring movement. In all refinements, it is preferred that the neutral setting is settable by the control device. The neutral setting may also be fixedly specified.

Further advantages and features of the present invention will emerge from the description of the exemplary embodiments, which will be discussed below with reference to the appended figures.

DETAILED DESCRIPTION OF THE INVENTION

Figure 1:
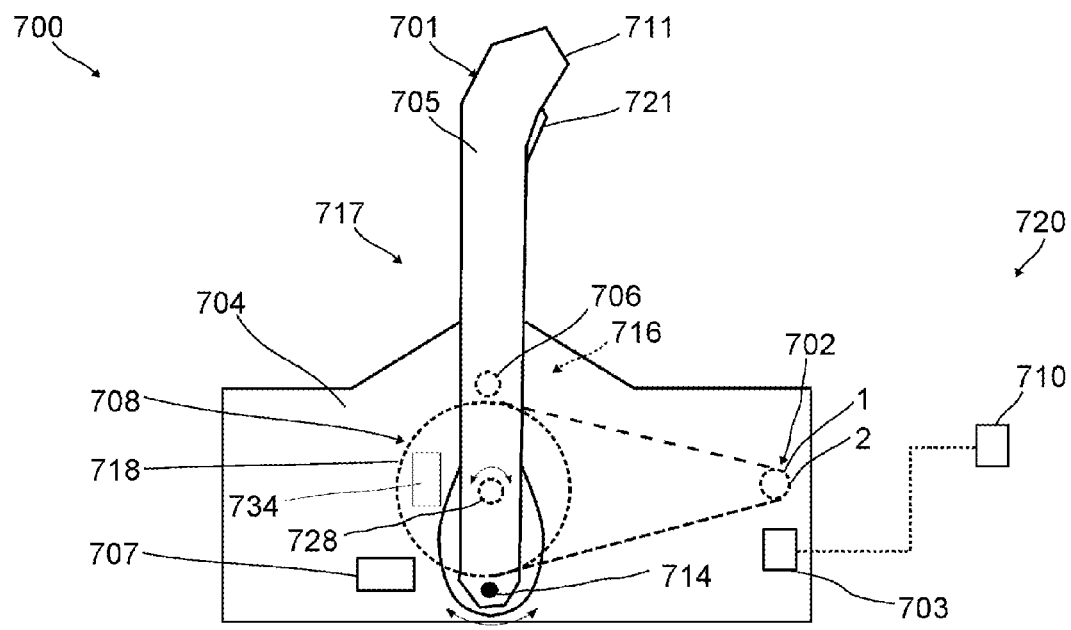
FIG. 1 is a purely schematic illustration of an input system having an input apparatus according to the invention in a partially sectional side view.

FIG. 1 shows an input apparatus 700 according to the invention, which is in the form of a joystick 711 and which is in this case part of an input system 720 and operated in accordance with the method according to the invention. The input system 720 furthermore comprises an input receiving apparatus 710 which is coupled to the input apparatus 700 and which is configured for example as a utility vehicle or else as a computer. Inputs into the input receiving apparatus 710 can be performed using the input apparatus 700. The operator control lever 705 is in this case equipped with a switch 721.

The input receiving apparatus 710 need not have a direct wired connection to the input apparatus 700; it may also be connected by way of a radio or signal system or network. The input receiving apparatus 710 may also be spatially remote from the input apparatus 700, for example if it is used to control an unmanned aircraft (for example drone).

The input apparatus 700 comprises an operator control device 701 with an operator control lever 705. The operator control lever 705 is in this case held on a support device 704 so as to be pivotable about two or more pivot axles 706, 716. For the sake of better clarity, only one pivot axle 706 is illustrated in more detail here. The operator control lever 705 is furthermore fastened to the support device 704 by means of a connection 714. After an actuation has been performed, the operator control lever 705 may be returned into a neutral setting 717 by means of a restoring unit 707.

The pivoting movement of the operator control lever 705 is targetedly dampened by means of a magnetorheological brake device 702 (also referred to as MRF brake). For this purpose, the brake device 702 is in this case coupled to the pivot axles 706, 716 via one or more transmission stages 708. The transmission stage 708 is configured here as a belt drive 718.

The brake device 702 is configured here for example as a rotary damper 1 or as a magnetorheological transfer device 2.

The pivoting movement of the operator control lever 705 is transmitted here to a rotary axle 728 of the belt drive 718 and via the belt to the brake device 702. The brake device 702 is thus set in rotational motion when the operator control lever 705 is pivoted.

Figure 2:
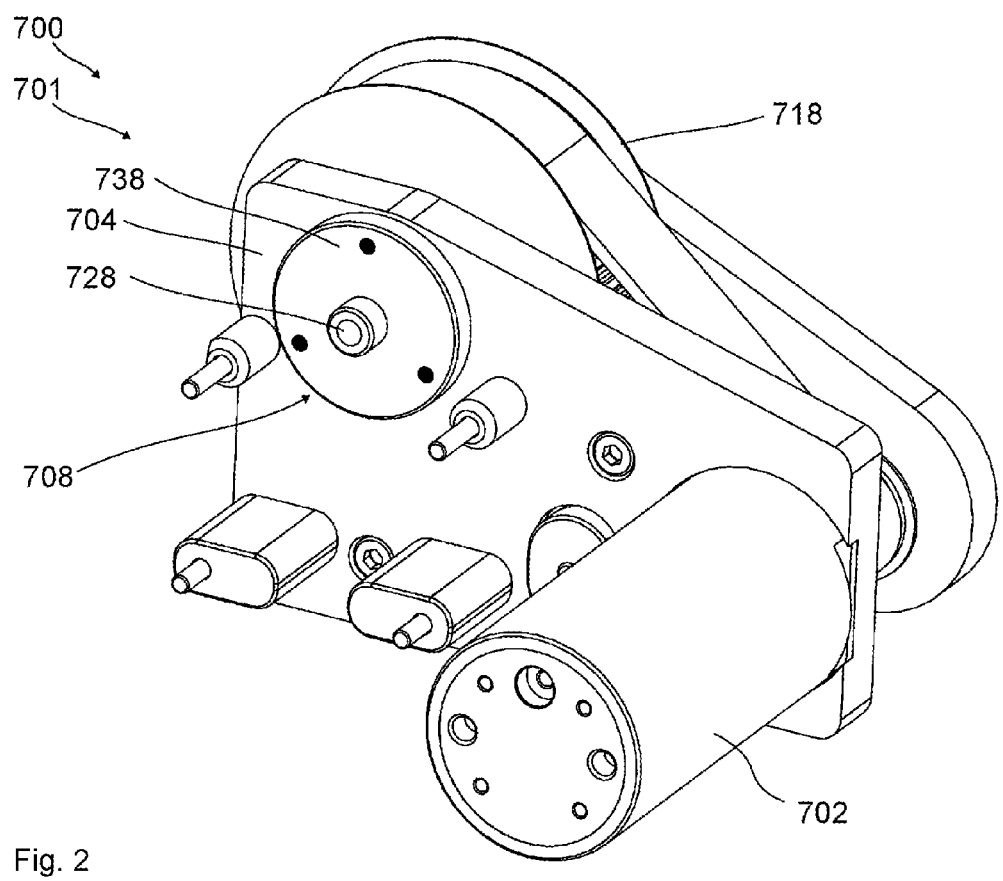
FIG. 2 is a detail illustration of the input apparatus of FIG. 1 in a perspective view.

The transmission stage 708 and the support device 704 and the brake device 702 are illustrated in more detail in FIG. 2. Here, the transfer of force from the operator control lever 705 to the in this case elongate and cylindrical shear damper of the brake device 702 is shown at the bottom right, at the front, in the figure. The operator control lever 705 is flange-mounted on the wheel 738 at the top left, such that, when pivoted, said operator control lever sets the transmission 708, and via the toothed belt the shear damper, in rotation.

The brake device 702 is controlled here by a control device 703, such that the retardation moment can be adapted to the respective operator control situation. For this purpose, here, the pivot angle of the operator control lever 705 is sensed by a sensor means 734. The sensor means 734 comprises, for example, an encoder, rotary encoder, Hall encoder or some other suitable sensor. For example, an absolute or a relative setting is sensed by means of the sensor. The pivot angle of the operator control lever 705 is sensed for example by way of the angular position or the rotational angle of the brake device 702 or of the transmission stage 708.

In this way, a haptic signal that is perceptible at the operator control lever 705, and for example a defined sequence 713 of retardation moments, can be generated. A user is thus provided with haptic feedback (so-called force feedback) as a consequence of an input that has been performed and/or while performing an input. The haptic signal is generated here by the control device 703 as a consequence of a control command. The control command is stored for example in the control device 703, for example as an angle-dependent function, or is generated by said control device on the basis of stored algorithms. The control device 703 may for example also receive the control command from the input receiving apparatus 710.

Furthermore, the control lever 705 can for example be automatically returned into the neutral setting 717 after an actuation has been performed. The restoring movement is in this case targetedly dampened by the brake device 702.

The invention provides an input apparatus 700 and in particular an advantageous joystick 711, in the case of which the detent positions are not mechanically fixedly specified, and/or in the case of which the behavior of the joystick 711 during movement is not mechanically fixedly specified, which can furthermore exhibit force feedback, and which in particular requires little structural space and can furthermore be produced inexpensively. Depending on the location of use, the low electrical consumption and the low weight are also advantageous.

In order to achieve this, a shear damper or wedge-type damper with magnetorheological fluid can, as controllable brake device 702, dampen the movement of the joystick 711 or generate the torques at the pivot point, or forces on the lever 705, that are required for this.

Here, a linear (pivoting) movement X-Y (of the joystick) is in particular firstly converted into a rotational movement and then dampened. In order that a sufficiently high resistance (force on the lever element or torque at the joystick center of rotation) can be provided, a speed ratio may be incorporated. The speed ratio may be 2:1 or 3:1 or 4:1 or more. In one specific variant, it is approximately 3:1. High speed ratios have the disadvantage of play (hysteresis) and require more structural space. They can however be used to correspondingly increase the braking moment of a shear damper. In one specific refinement, said speed ratio is less than or approximately equal to 4 Nm, such that, in the case of a speed ratio of 3:1, a controllable braking moment at the joystick of 12 Nm can be provided. The transfer may take place via a transmission with corresponding toothed gears, for example a spur-gear or worm-gear transmission, or by means of a toothed belt, V-belt, a chain or using harmonic drive transmissions.

The principle of the shear damper is described in the applicant's WO 2016/156544 A1 and can be used in the case of a joystick. The disclosure of WO 2016/156544 A1 is from page 1 to 41 including the associated figures on pages 1/6 to 6/6, and the content of disclosure of published claims 1 to 26 is incorporated into the content of disclosure of this application. In the specific case, a shear damper with magnetorheological fluid and 4 Nm braking moment has the dimensions of 32 mm diameter×80 mm length, that is to say a structural volume of approximately 65 000 mm3. By contrast, an electric motor with approximately 4 Nm torque (stepper motor, servo motor) has approximately the dimensions of 100×100×200 mm, that is to say a structural volume of approximately 2 500 000 mm3. This is approximately 38 times the structural volume of the shear damper.

Alternatively, as a brake device (brake/damper), use may also be made of the magnetorheological wedge principle as described in the applicant's WO 2012/034697 A1. The disclosure of WO 2012/034697 A1 from page 1 to 59 including the associated figures on pages 1/10 to 10/10 and the content of disclosure of published claims 1 to 22 are incorporated into the content of disclosure of this application. The magnetorheological wedge damper is even smaller than the magnetorheological shear damper, and has approximately the dimensions of 40 mm diameter x 20 mm, that is to say a structural volume of approximately 26 000 mm3, which is almost 100 times smaller than in the case of the electric motor.

This yields a considerable structural space advantage when using a brake device based on a shear damper or a magnetorheological wedge damper. The component weight is approximately directly related to the structural volume, that is to say is also considerably smaller in the case of the invention. Structural space and weight are decisive criteria in the case of many possible uses.

Hydraulic or pneumatic systems require less space than electric motors, but lines and additional systems are required for these (pressure accumulators, pumps . . . ). The controllability and generation of noise are furthermore highly disadvantageous. In the computer game or gaming sector, neither can be used or is accepted by users.

Electric motors furthermore have the disadvantage that, owing to their design, they generate large amounts of heat, and overheat if high torques (holding moments) are demanded over a relatively long period of time (the coil winding becomes warm, whereby the resistance in the coil wire increases, whereby the heating action becomes even more intense, etc.). The electrical current demand and the heating action then increase disproportionately as a result. Magnetorheological brake devices do not have this disadvantage.

In the case of the invention, the behavior of the joystick during movement, that is to say the actuating force or feedback thereby generated (normally with/at the hand performing the actuation), is variable on a situation-dependent basis. This is achieved in that fast control or variation of the regulation of the magnetic field in the magnetorheological brake device (for example in the shear damper) and thus of the intensity of the damping is performed in the controller of the electronics. The controller reacts preferably rapidly to the present operating mode or use case, and as a result to the speed and/or to changes in speed and/or to changes in direction at the joystick. Use cases are situation-dependent usage cases. A usage case encompasses a number of scenarios, or even all possible scenarios, that can arise if a user attempts to use the described system to achieve a particular aim. A use case can also be referred to as a usage situation.

A barrier (increase of the torque for example to a maximum value) in one direction of rotation should not also cause a blockage in the other direction of rotation (freewheeling function). If the joystick is moved in the direction of the barrier, the torque should immediately be eliminated again when force is no longer being applied in the direction of the barrier. The user otherwise perceives a sticking of the joystick at the barrier. The lever practically remains "stuck", which impairs the resulting reaction (the desire of the user) in the vehicle. By contrast, if the joystick is moved in the direction of the barrier again, the torque should be immediately increased again in order that the user immediately notices the barrier again.

In the case of a construction with a shear damper, the linear or pivoting movement of the joystick can be converted into a rotational movement at a wheel.

By means of a transmission stage 708, the movement can be brought to a higher rotational speed in order that the shear damper can transmit a greater braking moment to the joystick. A specifically implemented shear damper can impart no more than 4 Nm braking moment in the available structural space. By means of the speed ratio (for example ratio 3:1), it is possible here to achieve a moment which is three times greater at the joystick. Here, the transmission may be composed only of toothed gears, or else may be equipped with toothed belts, chain(s), friction wheel(s) and the like. Toothed gears have the certain disadvantage that the geometry is specified by the size of the toothed gears. By contrast, the use of a toothed belt is more flexible in terms of construction, and also quiet. It is also possible for use to be made of toothed gears which are braced toward one another/against one another, whereby play between these is eliminated.

The magnetorheological brake device 702 or the shear damper or the MRF brake element may also be designed to be structurally larger, whereby higher damping/braking moments can be generated. In most cases, however, the combination of a relatively small damping/braking unit with a transmission is a better solution with regard to structural space, weight and costs.

Instead of the shear damper, it is possible in principle to use any MRF brake device (wedge-type bearings, rotary vanes etc.). In addition to the advantages also mentioned above, the transmission for implementing the speed ratio is advantageous for saving space, because the brake does not have to be directly flange-mounted, and can thus be positioned as desired.

Owing to the fast-reacting MRF brake (in the range of a few milliseconds), a multiplicity of haptic feedback actions can be generated. The advantages of MRF brakes, such as the fast reaction and a force/torque that is settable as desired during operation, are utilized here.

Figure 15:
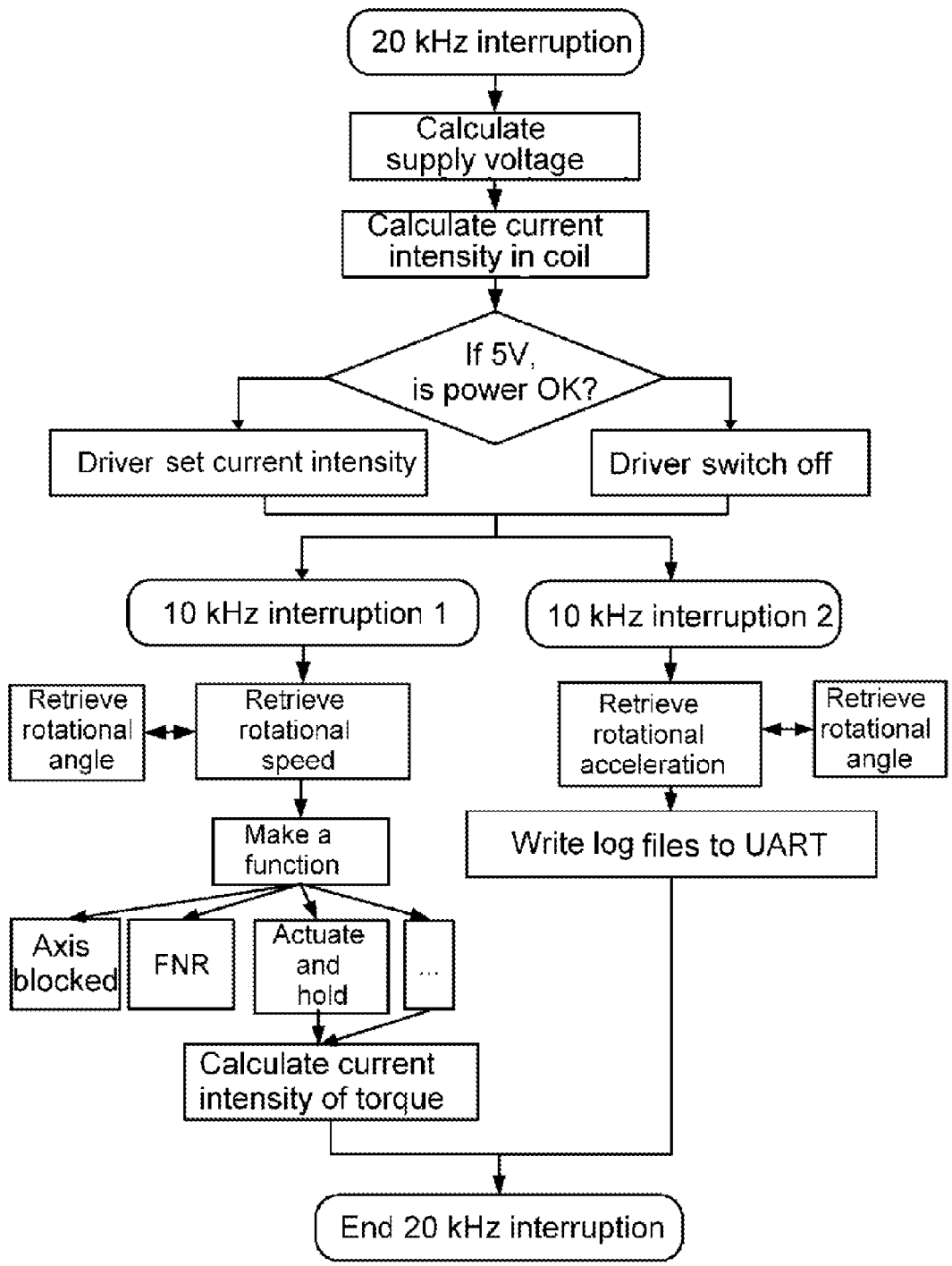
FIG. 15 is a diagram relating to the signal processing in the input apparatus according to the invention.

An exemplary signal processing configuration is illustrated in principle in the diagram of FIG. 15.

Exemplary control regimes or operator control situations (use cases) of the invention will be described below. Here, FIGS. 3 to 13 show profiles of the retardation moment versus the rotational angle or the time.

Spring-preloaded and non-adaptive joysticks oscillate/vibrate about the central setting (neutral setting) if released, and allowed to freely move, from the extreme setting. This can lead to undesired movements of the mechanism connected to the joystick (for example snow shovel of a piste roller; container loading in the case of a port crane).

In a standard mode, the invention prevents this return oscillation. No barriers or ripples are generated. Here, the maximum speed of the joystick movement is controlled (V control). The maximum speed is in this case dependent on the position (that is to say the angle) of the joystick. The closer it comes to the zero setting (central setting), the more the movement is braked, and the slower the possible movement is. An overshoot of the joystick beyond the neutral setting is thus prevented. If the joystick is simply released having been pushed forward, it is pulled back to the neutral position by the restoring spring and is braked exactly to 0°. Without active braking, it would, in particular if having previously been released from the end movement positions, overshoot the central position and then oscillate back again and settle over time. This is normally not desired by users, and is disadvantageous from an operator control aspect. The oscillation (decay) movements in the case of joysticks that are not controlled in accordance with this invention can also lead to disadvantageous load peaks on the tool/payload.

Figure 3:
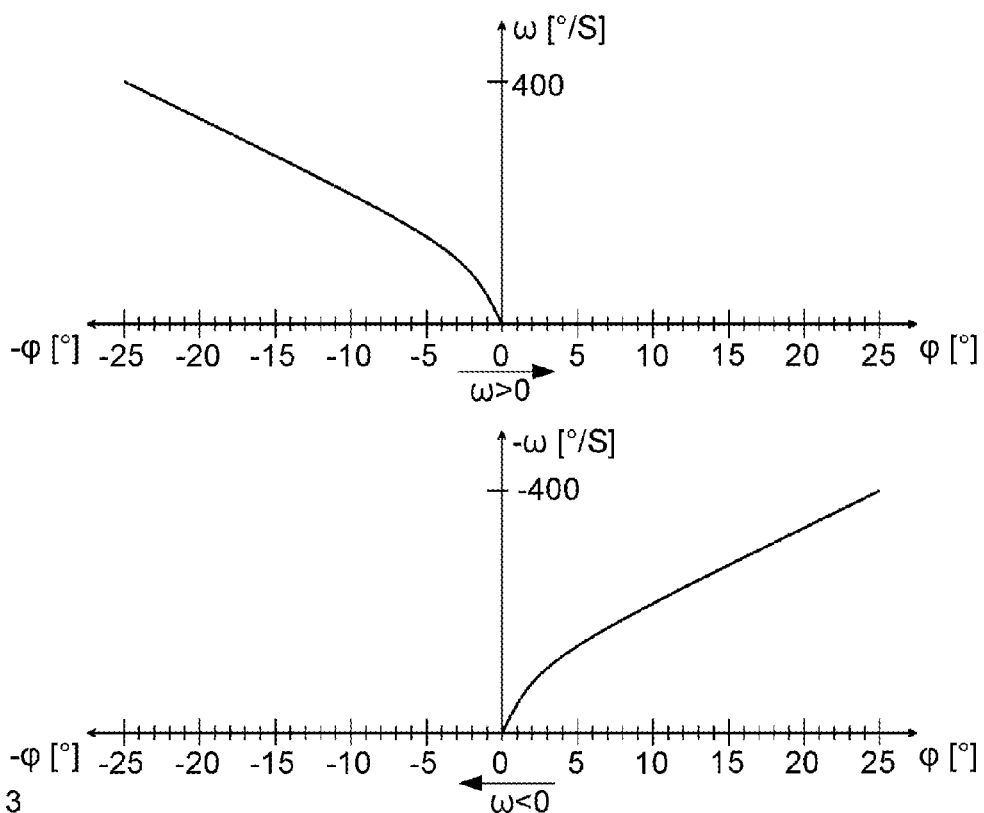
FIGS. 3-13 show purely schematic diagrams of profiles of retardation moments versus the pivot angle or versus the time.

FIG. 3 shows the maximum angular speed of the shear damper in the joystick as a function of the angular position of the joystick.

In the "unidirectional" operating mode, a movement is possible only in one direction.

The movement axis of the joystick is blocked from the 0° position in one direction, and a torque barrier is generated in this direction by the shear damper. A movement is possible only in the other direction.

Figure 4:
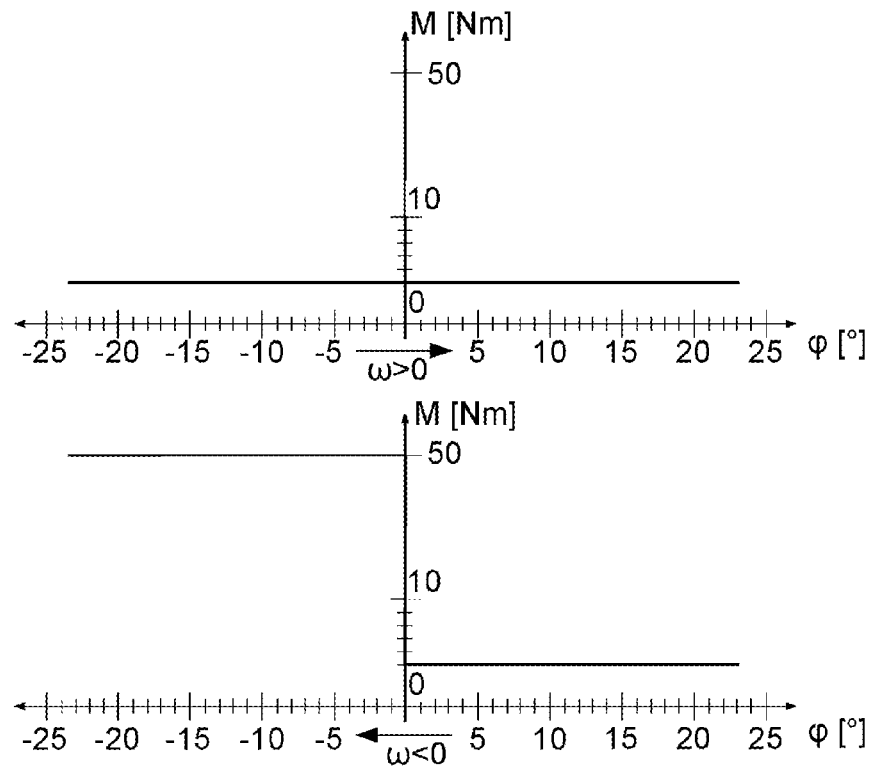

In FIG. 4, the barrier acts (only) in one direction. A torque barrier is generated in one rotational direction. The joystick can be pushed only in the opposite direction.

In the "smart stop" operating mode, the joystick can remain stationary at any position. The torque of the magnetorheological brake device and in this case of the shear damper is adapted to the profile of the spring characteristic curve of the restoring spring, that is to say the damper provides a braking force which is the same as the force applied by the restoring spring in the other direction. If a user pushes the joystick into a position and releases it, the joystick remains in exactly this position.

Figure 5:
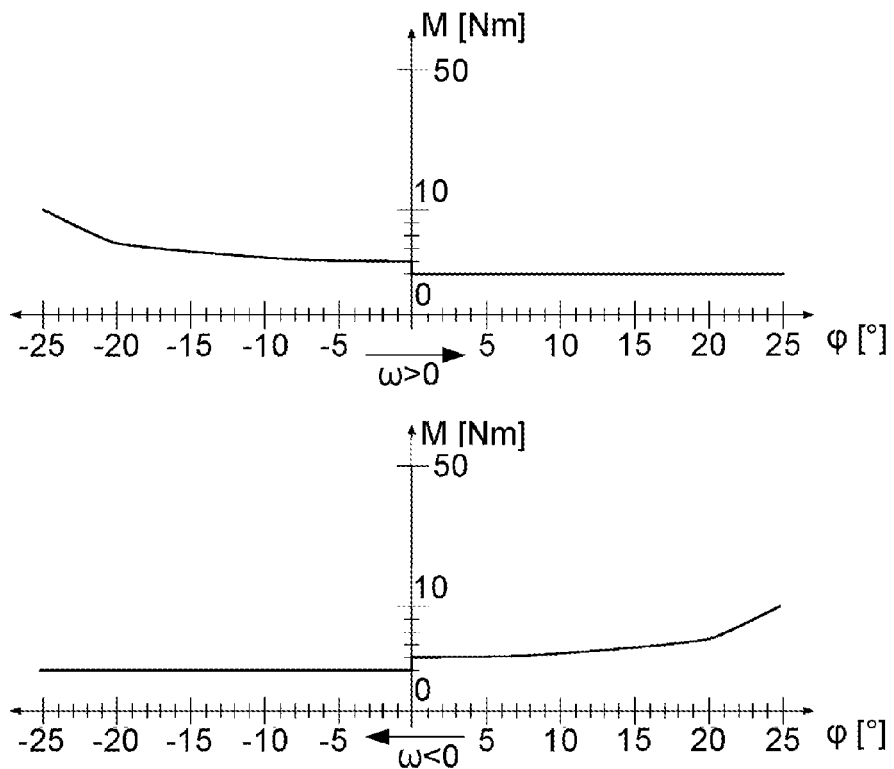

FIG. 5 shows the profile of the torque as a function of the characteristic curve of the resetting spring. The torque is always so high that, when released, the joystick remains in the respective position.

In the "ripple" operating mode, the torque at the operator control lever and thus the force at the human-machine interface (for example hand) is alternated/adjusted between a low and a high value. The user thus senses a raster of alternating movement and braking. The intervals and lengths of the individual torque positions may be controlled either on a time basis or on an angle-dependent basis or as a combination of these. In the angle-controlled ripple, the barriers are started at particular angular positions and are held as far as a particular angle (angle-triggered).

Figure 6:
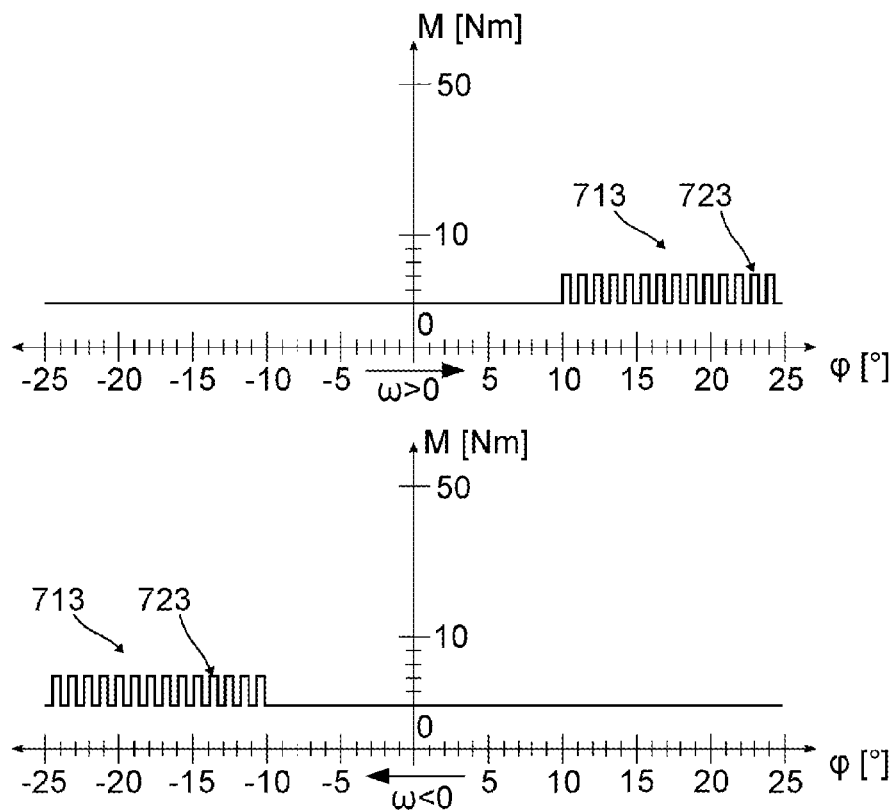

This mode is shown in FIG. 6. The ripple begins at 10° and changes the resistance in 1° steps. The ripple is in this case generated only in one direction (and no longer during the movement back to the 0 position).

FIG. 6 shows a ripple triggered and controlled on the basis of the angle. The braking moment (Y axis) is applied alternately between a high and a low torque (for example base torque), or the force (Y axis) between the operator's hand and joystick at the lever is varied.

Figure 7:
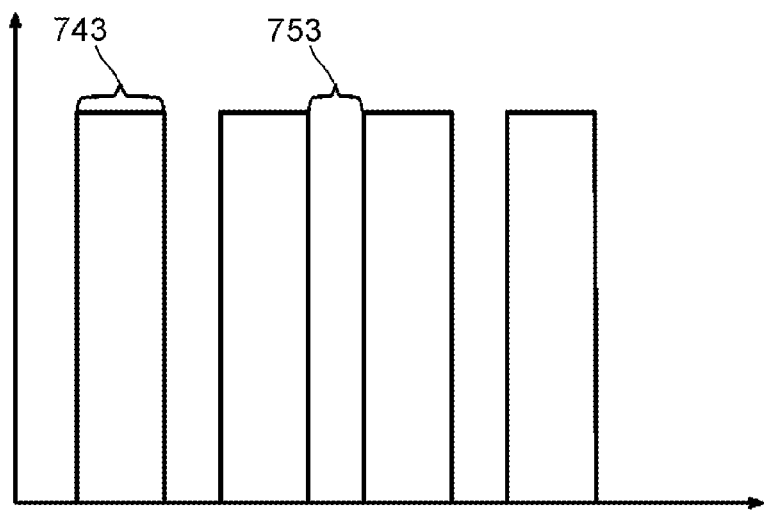

In the mode with time-based control and time-based triggering, the length 743 of the barriers and also the interval 753 between the barriers are specified in terms of time (FIG. 7).

FIG. 7 shows the ripples triggered and controlled on the basis of time. The X axis shows the time, and the Y axis shows the force at the operator control lever or the torque (retardation moment) at the pivot point. The interval and the lengths are controlled on the basis of time.

Figure 8:
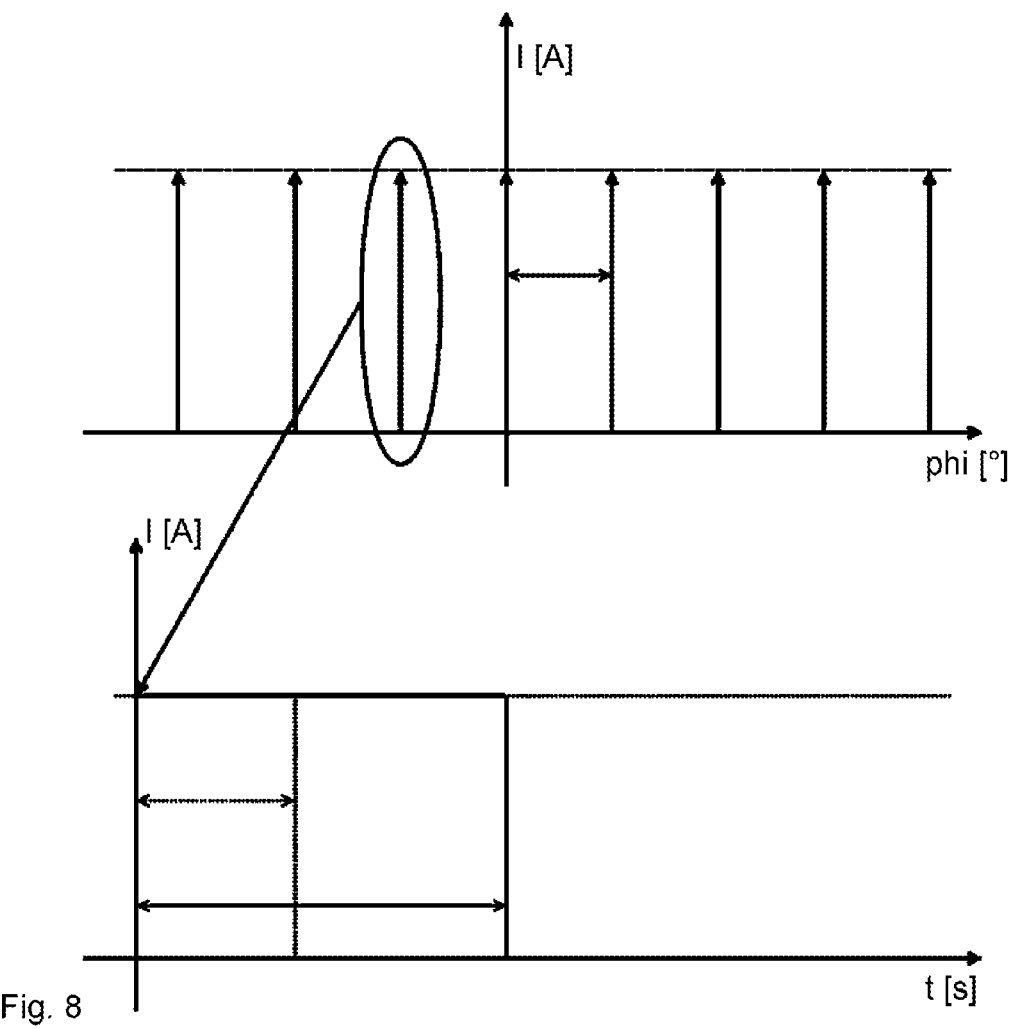

The two modes may be combined by exchanging the triggering. For example, the start points of the barriers may be specified on the basis of the angle, but the length may always extend over the same period of time, as shown in FIG. 8. If the ripple is started at a particular angle, the barrier is held over a particular time and then released irrespective of the angle that is then present. If an angular position (start position) is passed through during the duration of a ripple, this ripple point may be omitted or directly appended.

With this mode, it is for example possible for the movement speed to be controlled or, with a rapidly settable period duration, to realize a high-pass filter for vibrations or tremoring. Vibration or tremoring means that the feedback thus generated is perceived at the user's hand as a vibration or tremoring.

FIG. 8 shows the ripple controlled on the basis of time and triggered on the basis of angle. The length is specified in terms of time, and the start points are specified on the basis of the angle.

A ripple mode may self-evidently also be varied versus the time or the angular position; for example, the mode may change (become finer) after a certain number of ripple points. The user thus senses that a certain range has been reached, for example that the end setting, maximum speed etc. is being approached, in the form of a change in the ripple step width (=dynamic adaptation).

The spring ripple operating mode is a modified form of the ripple mode. The ripple barriers are not generated by a step change (low-high; few-many) of the actuator current and, as a result, of the magnetic field, but change continuously. The manner in which the barriers build up and decrease again is thus perceptible. The control signal may in this case be a sinusoidal or cosinusoidal signal with a slight offset from the zero point. The electrical current changes constantly without step changes and is briefly slightly negative; the metal in the damper or the magnetorheological brake device is thus demagnetized and briefly magnetized again before the electrical current becomes positive again, and is thus again demagnetized and re-magnetized. The user perceives this alternation of magnetization and demagnetization, and the continuous change of the damping/braking, as being similar to the braking by a detent spring in a slotted guide (peak/trough slotted guide).

Figure 9:
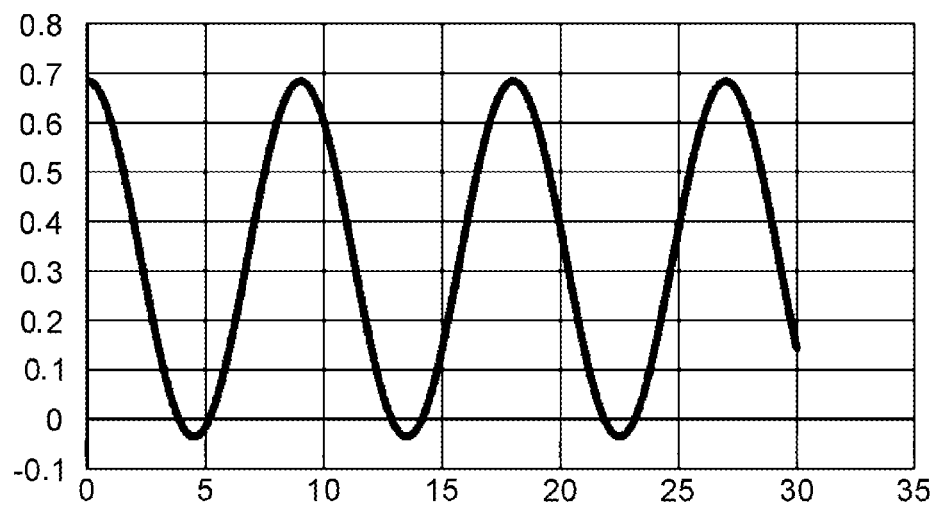

FIG. 9 shows the actuator current in the spring ripple mode. The current changes continuously with two zero crossings per period.

The electrical current may additionally be adapted to a or the angular speed. The torque of the damper is speed-dependent and becomes smaller at higher speeds. In order to obtain a uniform torque over different speeds, the electrical current must be increased.

Figure 10:
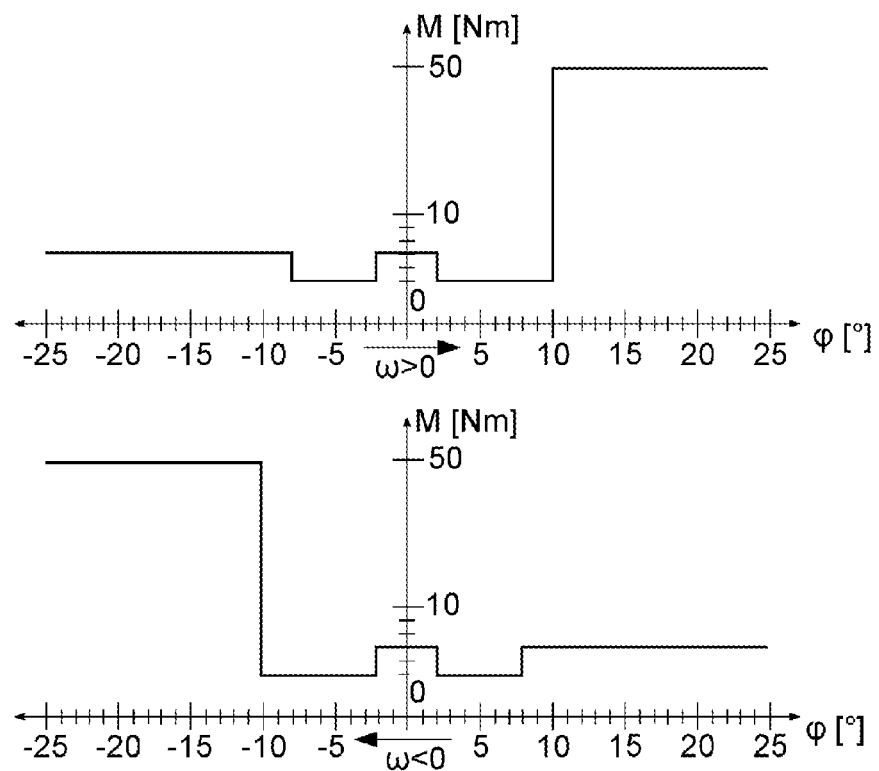

In the "FNR" (front, neutral, rear) operating mode shown in FIG. 10, the joystick can be set between different detent positions (for example in the case of an automatic gearshift: front, neutral, rear). The torque is minimal between the specified detent positions, and when the position is reached, said torque is increased to a value at which the joystick remains in position (remains static), because the restoring force of the spring is not sufficient to overcome the braking force. If the user wishes to move the joystick into a different position, the resistance must be overridden, and a movement to the next position can be performed. The detent positions are for example at −8°, 0° and 8°. An end stop in the form of maximum torque is generated at −10° and 10°, for example.

The advantage of the adaptive MRF technology in this case, in relation to conventional friction/slotted-guide brakes is that no stick-slip effect (adhesion effect) arises. In the case of conventional systems, it is initially necessary for static friction to be overcome. Since the sliding friction is much lower, the brake then slips, and when it comes to a standstill again, it adheres more intensely again; jerky movements thus arise at the joystick and at the tools or objects which are operatively connected to the joystick and which are to be operated. Jerky movements can lead to high load peaks and overload (increased machine wear). This is not the case with the solution according to the invention, and is a major advantage during use.

In the "axis locked" operating mode, a barrier with maximum torque is generated in all directions (proceeding from the zero position). The joystick is thus blocked in terms of its movement.

If the joystick is situated in the zero position, it cannot move. If it has initially been deflected, it can be brought back into the 0 position and then blocked. If the joystick has been deflected so as to be situated in a positive position and is accelerated in a positive direction (or situated in a negative position and negatively accelerated), the joystick is blocked. Otherwise, it can move freely in order that it can be moved back into the 0 position (basic position).

Figure 11:
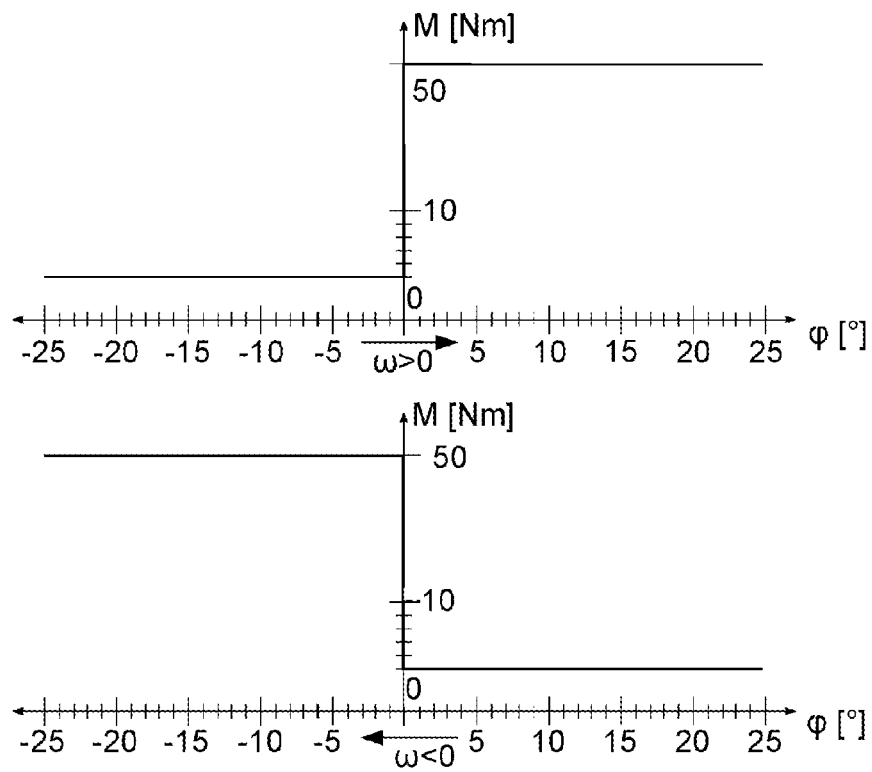

FIG. 11 shows the blocking of the movement in both directions.

In the "kick and hold" operating mode, at a particular angle, the resistance is increased over a short angle range. The resistance is also maintained during the return movement of the joystick by the restoring spring or by the user's hand, and is thus active in both movement directions. It may however also be active only in one movement direction. The joystick is then held in the position. In the figure, the torque peak begins at 15° and ends at 18°. This means that, if the joystick is pushed beyond this range (in this case beyond) 18° and released, it moves back to 18° under spring load and thereafter remains at 18°. If it is below 18°, it returns into the zero position under spring preload.

Figure 12:
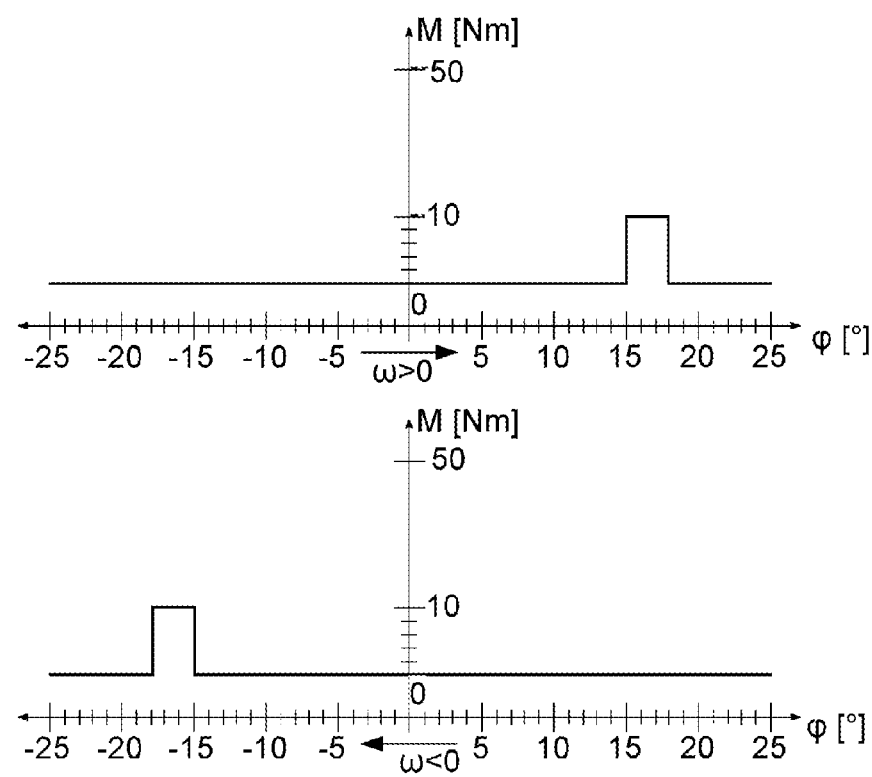

FIG. 12 shows "kick and hold" in a forward direction. The torque peak is in this case provided in both pivoting directions (that is to say forward and back proceeding from the neutral setting).

Figure 13:
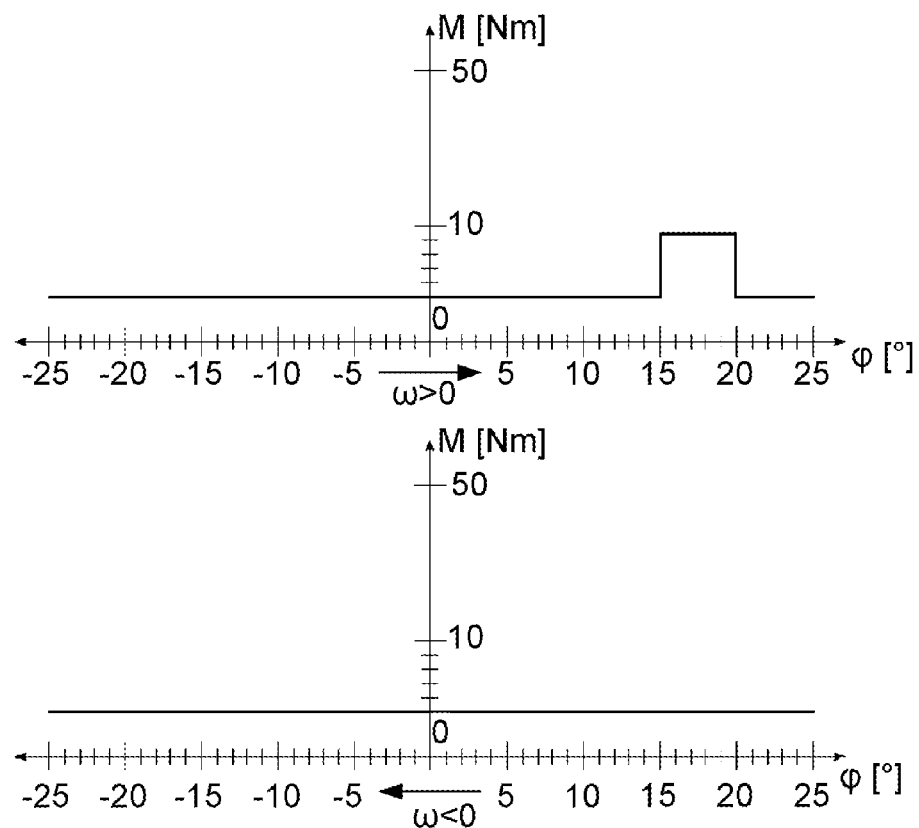

In the "kick down" operating mode, a brief resistance is generated in one direction, and the return movement takes place as far as the 0 position without resistance. In the example of FIG. 13, the torque peak in the range 15-20° must be overcome, and a return movement is thereafter possible without braking. As shown in FIG. 13, a brief resistance is generated in one direction, and the return movement takes place without resistance.

Figure 14:
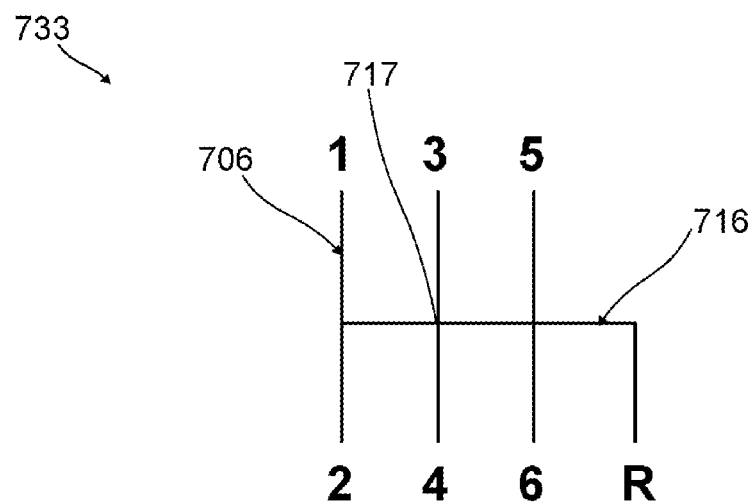
FIG. 14 is a purely schematic illustration of a slotted-guide mechanism simulated by means of the input apparatus according to the invention.

In the operating mode with freely selectable "slotted guide", the adaptive joystick according to this invention is used, for example, to replicate the classic slotted guide of a mechanical gearshift (for example H-shaped gearshift/slotted guide). Such a slotted guide mechanism 733 is shown in FIG. 14.

Here, the MRF dampers/brakes according to this invention are controlled in alternating fashion such that the joystick can be moved only in accordance with, for example, an H-shaped pattern. If the operator/user wishes, for example, to move the joystick, or in this case the gearshift lever, of for example a motor vehicle (automobile) diagonally from the gearshift setting 2 to the gearshift setting 3, this is prevented by electrical energization of the X-axis and Y-axis MRF dampers (magnetorheological brake device). Initially only a movement of the Y-axis damper is allowed, and the X-axis damper is blocked. Proceeding from the center of the Y movement, only a movement of the X-axis damper is allowed, and the Y-axis damper is blocked. Then, after a certain distance in the X direction, it is in turn the case that only a movement of the Y-axis damper is allowed, until the setting 3 is reached. The user thus has the sensation of performing gearshifts manually in a slotted guide such as is familiar from their automobile with manual transmission. The gearshift is however in fact performed automatically by means of the electronics (shift by wire) and by simulation of a slotted guide through intelligent control of the X and Y MRF axes.

It is important here that this is implemented in fast and harmonious fashion. It is thus also possible for different numbers of gear ratios, automatic gearshift levers in one, two or three planes, sequential gearshift patterns and different structural forms to be generated virtually. It is also possible for different gearshift forces, movement travels and even gearshifts of vintage vehicles to be replicated. For example, in the case of a loan car or rental car, it is always possible for the preferred gearshift method of the user (customer) to be applied/preset, which reduces operator control convenience and incorrect operator control.

In the operating mode of "increasing resistance", the resistance increases in particular linearly or by way of a polynomial and thus, by way of the resistance, indicates to the user the range in which they are situated. For example, the resistance becomes higher the faster a machine is operated or the load is moved, and thus prevents accidents resulting from excessively high speeds.

A combination of the modes is also possible. It is thus possible for any desired modes to be combined. For example, a "ripple" and the "smart stop" may be combined such that the joystick, when moved, generates a ripple and, when released, remains static at that setting. By means of the sensor arrangement, it is also possible to switch quickly between the modes if the direction is changed.

An expansion from one movement axis to two movement axes or even three movement axes is possible.

The following statements relating to the various operating modes are made in each case for one movement axis (forward and back; X axis). They are however analogously expandable to a second or third axis (left, right; Y axis, Z axis).

For use in gaming, demands such as good stability even during fast movements (stable material, sufficient weight) are placed on the gaming joystick. The joystick should be ergonomically shaped, be a good replication of real control joysticks, and possibly have a sufficient number of buttons for special assignments.

The resistance of the joystick preferably changes in accordance with the game situation. It is thus possible to realize an adaptation to real systems (for example, in a flight simulator game, the joystick of a Boeing 747 behaves differently to that of a Cessna), and/or an additional response/feedback of the system by way of vibrations is possible.

The resistance at the zero point is an important criterion in particular for gamers (flight simulators): real cockpit joysticks have only very low resistance about the zero point, and good joysticks should replicate the real cockpit joysticks as effectively as possible. An MRF brake device with a very low base moment can keep the resistance about the zero point very low.

By means of an MRF brake, vibration can be simulated "passively" through the generation of a ripple with very short intervals, whereby the user senses a vibration during movement.

A particular advantage of the invention is the adaptivity. It is possible for a series-produced part to be developed that can be adapted in any desired manner to respective customer demands. Small series can thus be produced much more quickly, and production costs can be saved.

At the same time, it is possible for a series of dummy buttons to be provided that are individually assigned. Customer-specific personalization is possible. Configuration for right-handed and left-handed users is possible. Personalized and/or intelligent feedback is possible. The construction is flexibly adaptable. Low costs are incurred owing to a small number of parts.

The force of the spring or restoring spring can be canceled out. The force of the restoring spring used may in particular be "set" through damping of the restoring force. It is thus possible to use the same spring strength for different joysticks in which restoring forces of different intensity are desired (in this case, it would be necessary for active assistance to be provided during movement counter to the spring). The adaptability also applies to varying temperatures, contamination, aging and wear. The user is provided with the same (familiar) haptic feedback and behavior irrespective of these changed parameters.

It is also possible to perform setting of the pressure point and of the forces. The adjusting force (pressure point) etc. can be adapted in accordance with the customer or the customer demand. This is also possible in a manner dependent on the external state, that is to say in the presence of a slippery underlying surface under a vehicle: lower moments/forces. This reduces the operator control force and user fatigue. In the case of rough roads or uneven terrain: higher forces/torques. This reduces incorrect gearshifts or allows more precise movement.

A further considerable advantage is that no stick-slip effect arises. The braking/damping is not performed by way of classic friction-based brakes. The MRF dampers provide damping in a manner dependent on the electrical current/magnetic field. When the magnetic field is switched off, the braking action is immediately eliminated irrespective of the speed of the movement. The braking force is not speed-dependent or has only a low-speed dependency, and the jerky movements of the stick-slip effect thus cannot arise.

A multi-axle mode is also possible (multi-axis and single-axis mode). Each individual rotational movement about a respectively separate axle can be controlled separately by means of separate magnetorheological brake devices. It may also be the case that a single magnetorheological brake device is sufficient to provide braking of rotational movement about different axles.

With the same series-produced part, it is possible to generate joysticks either with only one movement direction (for example forward) or up to 4 directions (forward, back, left, right).

Haptic indication of the power level is possible. The power imparted by a machine/vehicle may be indicated for example by increased resistance.

Through haptic feedback, the safety of the operator control of machines can be considerably increased, because the user does not need to direct their view to displays in order to identify problems.

Medical applications can also be advantageously implemented with the invention. For example, control of robots during an operation is possible, for example in order to avoid incorrect incisions using a scalpel or in order to reproduce different cutting forces. In a laboratory, laboratory equipment can be controlled. For example, in microscopy, an automatic movement of a sample holder can be performed in order to avoid collisions.

Inadvertent actuation can be prevented. An adaptation to external circumstances is possible. An inadvertent actuation can be prevented if, for example, it is implemented as standard that a short ripple is generated after a relatively long period of non-use. A user thus immediately senses if they move the joystick in an undesired manner. An externally originating impact (for example if a pothole is driven through) can also lead to an undesired adjustment. By increasing the force/torque if such an event occurs and is detected by the overall system, analyzed and transmitted to the joystick control unit, this can be prevented. For example, if a vehicle acceleration sensor identifies increased vehicle body movements, then the required joystick actuation force/moment is automatically adapted such that incorrect operator control actions are reduced.

The joystick may, via Bluetooth, WLAN, ZigBee, NFC, Wi-Fi, LiFi, 3G, smartphone, smartwatch, chip, key etc., identify which user wishes to use the joystick and thus adapt to the requirements/preferences of that user in a preconfigured or automatic manner. The joystick or the control electronics connected thereto may also have learning capability (fuzzy logic, artificial intelligence, machine learning) and thus continuously optimize operator control convenience and reduce operator control error.

Near-field detection systems (radar, ultrasound, camera-based, lidar . . . ) provide important information to the control electronics of the joystick and thus influence the haptic feedback.

Several systems are interlinked with one another, and it is also possible for external signals to be supplied (for example via Bluetooth, WLAN, ZigBee, NFC, Wi-Fi, LiFi, 3G, 5G . . . ), and all data are analyzed and result in corresponding real-time feedback at the joystick. In this way, complex situations can be more easily and more safely handled using the joystick owing to the situation-dependent feedback.

The angle sensor preferably has more than 30 000 increments per rotation, and the control frequency of the controller is preferably greater than 5 kHz.

The overall system may also be of redundant construction if this is necessitated by the intended use (for example duplex position sensors and rotary dampers . . . ).

If the control electronics identifies, at an early point in time, an impending failure of a relevant sensor or damper, this can be clearly signaled to the user in the form of haptic feedback (for example sustained intense vibration). This is also the case if, for example, the sensor of the Y axis fails but the user wishes to/must continue to perform actuation in the X axis. The adaptive joystick may also adapt to such special or emergency situations and assist the user as best as possible with the remaining possible operator control actions (with feedback).

In all refinements, developments and embodiments, it is possible for acoustic signals or sounds to be output by means of the magnetorheological brake device. For this purpose, the magnetorheological brake device is targetedly braked with a corresponding (constant or variable) frequency such that a corresponding sound signal is generated. In particular, the control device is used for the purposes of control. It is however also possible for a separate signal generator to be used for targeted control of the sound signals and for controlling (activating and deactivating) the brake device. In addition to an in particular rhythmic activation and deactivation of the brake device, it is also possible for a corresponding increase and reduction of the braking action to be generated in order to output acoustic signals or sounds. An alternative or additional output of sound is also possible in all refinements by means of a loudspeaker or sound generator.

LIST OF REFERENCE DESIGNATIONS

1 Rotary damper
2 Transmitting device
700 Input apparatus
701 Operator control device
702 Brake device
703 Control device
704 Support device
705 Operator control lever
706 Pivot axle
707 Restoring unit
708 Transmission stage
710 Input receiving apparatus
711 Joystick
713 Sequence
714 Connection
716 Pivot axle
717 Neutral setting
718 Belt drive
720 Input system
721 Switch
723 Ripple
728 Rotary axle
733 Slotted guide mechanism
734 Sensor means
743 Length
753 Interval

The invention claimed is:

1. An input apparatus, comprising:
an operator control device, a magnetorheological brake device, and a control device for controlling said brake device;
said operator control device including a support and an operator control lever pivotably held on said support about at least one pivot axis; and
at least one sensor for sensing a pivot angle of said operator control lever;
said brake device being configured to dampen a pivoting movement of said operator control lever about said pivot axis under control by said control device;
said control device being configured to control said brake device in dependence on a control command and to convert the control command into a haptic signal that is perceptible at said operator control lever to provide a user of the input apparatus with haptic feedback (force feedback) as a consequence of an input that is being performed or that has been performed; and
said operator control lever being held on said support device for pivoting about at least two pivot axes, and in each case at least one brake device being coupled to at least one pivot axle, and said control device being configured to separately dampen the pivoting about each of said pivot axes during a pivoting movement of said operator control lever.

2. The input apparatus according to claim 1, which further comprises a restoring unit configured to automatically pivot said operator control lever back into a neutral setting after an actuation has been performed, and wherein said control device is configured to targetedly dampen, by way of said brake device, a restoring movement performed by said restoring unit.

3. The input apparatus according to claim 1, wherein said control device is configured to automatically fix said operator control lever in a current actuation setting after an actuation has been performed, by setting a targeted retardation moment by way of said brake device.

4. The input apparatus according to claim 1, wherein said control device is configured to adapt a damping of the pivoting movement of said operator control lever in dependence on a pivot angle of said operator control lever sensed by said sensor.

5. The input apparatus according to claim 1, wherein the control command is provided by at least one input receiving apparatus, which is coupled to the input apparatus, and/or by the input apparatus itself.

6. The input apparatus according to claim 1, wherein said control device is configured to block a pivoting movement of said operator control lever in at least one direction and to enable a pivoting movement of the operator control lever in an opposite direction.

7. The input apparatus according to claim 1, wherein said control device is configured to cause said operator control lever to be fixed at particular detent positions and, for the purpose, to use said brake device to targetedly increase a present retardation torque, such that neither an onward movement nor a restoring movement can take place without additional expenditure of force and/or without additional action by the user.

8. The input apparatus according to claim 1, wherein said control device is configured to increase the retardation torque proceeding already from a defined pivot angle before a detent position is reached, and/or to reduce the retardation torque proceeding from a defined pivot angle after the detent position has been departed from.

9. The input apparatus according to claim 1, wherein the control device is suitable and configured to block the operator control lever when at least one particular pivot angle is reached and/or in the neutral setting and/or in the present setting such that no onward movement in at least one pivoting direction and/or in all operational pivoting directions is possible with a manual force that is to be imparted during operation.

10. The input apparatus according to claim 1, wherein said control device is configured to simulate a slotted guide mechanism by way of a combination of a multiplicity of detent settings and at least one neutral setting and a multiplicity of pivot-angle-dependent blockages of said operator control lever.

11. The input apparatus according to claim 10, wherein said control device is configured to store multiple simulatable slotted guide mechanisms, and said control device is configured to select and simulate a slotted guide mechanism in dependence on a user input and/or a control command from an input receiving apparatus.

12. The input apparatus according to claim 1, wherein said control device is configured to retard and enable the pivoting movement of said operator control lever by way of said brake device in a targeted sequence of retardation torques and, in order to implement such a sequence, to set retardation torques of different magnitude for a retardation and an enablement and to set the retardation torques for the retardation and/or the enablement as a function of a time and/or as a function of a pivot angle.

13. The input apparatus according to claim 12, wherein said control device is configured to start the retardation torques of the sequence of retardation torques on an angle-dependent basis and to maintain said retardation moments on a time-dependent basis.

14. The input apparatus according to claim 12, wherein said control device is configured to set the different retardation torques of the sequence with such a frequency that the pivoting movement of the operator control lever is dampened with a targeted vibration.

15. The input apparatus according to claim 12, wherein said control device is configured to dynamically adapt the different retardation torques of the sequence versus the time and/or the pivot angle of said operator control lever and/or a movement speed of said operator control lever and/or a number of settings of retardation torques that have taken place.

16. The input apparatus according to claim 12, wherein said control device is configured to set a sequence with continuously varying retardation torques, and wherein a sinusoidal or cosinusoidal profile is provided for this purpose.

17. The input apparatus according to claim 1, wherein said control device is configured to output a haptic warning signal by setting a defined sequence of retardation torques in response to an actuation of said operator control lever after a defined time without an actuation of said operator control lever.

18. The input apparatus according to claim 1, wherein said brake device is a magnetorheological brake device configured to provide at least 30,000 increments per full rotation of said operator control lever about the pivot axis.

19. The input apparatus according to claim 1, wherein:
said brake device is a rotary damper with two mutually pivotable components being an inner component and an outer component radially surrounding said inner component at least in certain sections;
said inner and outer components forming a ring-shaped and encircling damping gap therebetween that is radially delimited at the inside by said inner component and radially delimited at the outside by said outer component;
said damping gap is at least partially filled with a magnetorheological medium and said damping gap is selectively exposed to a magnetic field in order to dampen a pivoting movement between said two mutually pivotable components about an axle; and
at least one of said components is formed with a multiplicity of at least partially radially extending arms; and
at least some of said arms are equipped with an electrical coil with one or more windings in each case extending adjacent to the axle and spaced apart from the axle.

20. An input system, comprising:
an input apparatus according to claim 1;
an input receiving apparatus operatively connected to said input apparatus, and:
wherein said input receiving apparatus is a utility vehicle and functions of the utility vehicle are at least partially operated using said input apparatus;
and/or
wherein said input receiving apparatus is a computer receiving input signals from said input apparatus.

21. The input system according to claim 20, wherein the input apparatus is a joystick and the computer is programmed with a simulation program and/or a game program.

22. An input apparatus, comprising:
an operator control device, a magnetorheological brake device, and a control device for controlling said brake device;
said operator control device including a support and an operator control lever pivotably held on said support about at least one pivot axis; and
at least one sensor for sensing a pivot angle of said operator control lever;
said brake device being configured to dampen a pivoting movement of said operator control lever about said pivot axis under control by said control device;
said control device being configured to control said brake device in dependence on a control command and to convert the control command into a haptic signal that is perceptible at said operator control lever to provide a user of the input apparatus with haptic feedback (force feedback) as a consequence of an input that is being performed or that has been performed; and
said control device being configured, when at least one defined pivot angle is reached, to increase a retardation torque by way of said brake device over a particular pivot angle range, and, after the pivot angle range has been passed through, to fix the operator control lever in a target setting outside the neutral setting, and, for this purpose, to use said brake device to targetedly set a retardation moment which is equal to, or higher than, a restoring torque of a restoring unit at the target setting.

23. The input apparatus according to claim 22, wherein said control device is configured to provide the elevated retardation torque for passing through the pivot angle range in only one direction and, after having passed through the pivot angle range, said operator control lever is pivotable back without the elevated retardation torque.

24. An input apparatus, comprising:
an operator control device, a magnetorheological brake device, and a control device for controlling said brake device;
said operator control device including a support and an operator control lever pivotably held on said support about at least one pivot axis; and
at least one sensor for sensing a pivot angle of said operator control lever;
said brake device being configured to dampen a pivoting movement of said operator control lever about said pivot axis under control by said control device;

said control device being configured to control said brake device in dependence on a control command and to convert the control command into a haptic signal that is perceptible at said operator control lever to provide a user of the input apparatus with haptic feedback (force feedback) as a consequence of an input that is being performed or that has been performed; and said brake device being coupled to a pivot axle of said operator control lever via a transmission stage and the transmission stage having a speed ratio between 2:1 and 5:1.

25. The input apparatus according to claim 24, wherein said transmission stage comprises at least one belt drive which couples said pivot axle to a rotary axle of said brake device.

26. An input apparatus, comprising:

an operator control device, a magnetorheological brake device, and a control device for controlling said brake device;

said operator control device including a support and an operator control lever pivotably held on said support about at least one pivot axis; and at least one sensor for sensing a pivot angle of said operator control lever;

said brake device being configured to dampen a pivoting movement of said operator control lever about said pivot axis under control by said control device;

said control device being configured to control said brake device in dependence on a control command and to convert the control command into a haptic signal that is perceptible at said operator control lever to provide a user of the input apparatus with haptic feedback (force feedback) as a consequence of an input that is being performed or that has been performed; and said brake device being a magnetorheological transfer device, and the magnetorheological transfer device being equipped with at least two couplable components with a coupling intensity of which can be influenced, at least one channel being provided for the purposes of influencing the coupling intensity, said channel containing a magnetorheological medium which can be influenced by a magnetic field and which contains magnetically polarizable particles, and at least one magnetic-field-generating device for generating a magnetic field in said channel is provided in order to influence the magnetorheological medium in the channel by way of the magnetic field, one of the components, being an outer component, surrounds an inner component, and at least one of said two components is mounted by way of at least one separate bearing, and a spacing between said outer component and said inner component is at least ten times a typical mean diameter of magnetically polarizable particles contained in the magnetorheological medium, and said channel can be at least partially subjected to the magnetic field of said magnetic-field-generating device in order to selectively interlink or release the particles.

27. A method of operating an input apparatus, the method comprising:

manually pivoting at least one operator control lever of the input apparatus about a pivot axle in order to perform an input into an input receiving apparatus that is operatively connected to the input apparatus;

targetedly damping or enabling a pivoting movement of the operator control lever by a magnetorheological brake device that is coupled to the pivot axle; and controlling the brake device with a control device in dependence on a pivot angle of the operator control lever sensed by a sensor and/or in dependence on a time and/or in dependence on at least one operating state of the input receiving apparatus, in order to targetedly adapt the damping; and if an operating state is present with a parameter that exceeds a threshold value and/or with a hazard that exceeds a threshold value, and/or if an assistance system intervenes, haptically signaling with a targeted sequence of different retardation torques during a pivoting movement of the operator control lever.

28. The method according to claim 27, wherein the operating state of the input receiving apparatus relates to at least one parameter selected from the group of parameters consisting of a power state, a speed, an acceleration, a situation in space, surroundings, underlying surface being driven on, work performed, a selected user profile, a selected operating mode, an activity of an assistance system, a driving assistance system, a situation simulated by software, and an input condition in an operator control of a program.

29. The method according to claim 27, which comprises damping or blocking a pivotability of the operator control lever with intensified action if an operating state with a disturbance and/or hazard that exceeds a threshold value is present and/or if an assistance system actively intervenes in a use of the input receiving apparatus.

30. A method of operating an input apparatus, the method comprising:

manually pivoting at least one operator control lever of the input apparatus about a pivot axle in order to perform an input into an input receiving apparatus that is operatively connected to the input apparatus;

targetedly damping or enabling a pivoting movement of the operator control lever by a magnetorheological brake device that is coupled to the pivot axle; and controlling the brake device with a control device in dependence on a pivot angle of the operator control lever sensed by a sensor and/or in dependence on a time and/or in dependence on at least one operating state of the input receiving apparatus, in order to targetedly adapt the damping; and damping or blocking a pivotability or pivoting movement of the operator control lever with variably intensified action in dependence on a real operating situation and/or on a situation simulated by software.

* * * * *